US009225599B2

(12) United States Patent
Wieczorek et al.

(10) Patent No.: US 9,225,599 B2
(45) Date of Patent: Dec. 29, 2015

(54) METHOD AND SYSTEM TO ADAPT FUNCTIONALITY TO CAPABILITIES OF CLIENT AND DATA STORAGE

(71) Applicant: Software AG, Darmstadt (DE)

(72) Inventors: Michael Wieczorek, Dillingen (DE); Torsten Haase, Saarbrucken (DE)

(73) Assignee: Software AG, Darmstadt (DE)

( * ) Notice: Subject to any disclaimer, the term of this patent is extended or adjusted under 35 U.S.C. 154(b) by 3 days.

(21) Appl. No.: 14/107,859

(22) Filed: Dec. 16, 2013

(65) Prior Publication Data
US 2015/0172123 A1 Jun. 18, 2015

(51) Int. Cl.
*H04L 12/24* (2006.01)
*H04L 29/06* (2006.01)

(52) U.S. Cl.
CPC ............ *H04L 41/0866* (2013.01); *H04L 67/42* (2013.01)

(58) Field of Classification Search
CPC ...................... H04M 1/72563; H04M 1/72569; H04M 1/72519; G06F 17/30867; H04L 41/0866; H04L 67/42
See application file for complete search history.

(56) References Cited

U.S. PATENT DOCUMENTS

| | | | | |
|---|---|---|---|---|
| 5,956,508 A * | 9/1999 | Johnson et al. | ............... | 719/315 |
| 6,345,297 B1 * | 2/2002 | Grimm et al. | ................ | 709/227 |
| 6,529,943 B1 * | 3/2003 | Ohi | ............................... | 709/206 |
| 7,444,337 B2 * | 10/2008 | Zhou et al. | ........................... | 1/1 |
| 7,568,018 B1 * | 7/2009 | Hove et al. | ..................... | 709/221 |
| 7,904,508 B2 * | 3/2011 | Bernabeu-Auban et al. | . . | 709/203 |
| 7,937,696 B2 * | 5/2011 | Blossom et al. | ............. | 717/168 |
| 8,019,845 B2 * | 9/2011 | Childress et al. | ............. | 709/223 |
| 8,438,378 B2 * | 5/2013 | Lazar | ............................ | 713/100 |
| 8,874,640 B2 * | 10/2014 | Rajaraman et al. | ........... | 709/203 |
| 2006/0143601 A1 * | 6/2006 | Concha et al. | ................ | 717/170 |
| 2006/0248184 A1 * | 11/2006 | Wu et al. | ........................ | 709/224 |
| 2008/0178199 A1 * | 7/2008 | Tanabe | .......................... | 719/320 |

* cited by examiner

*Primary Examiner* — Hua Fan
*Assistant Examiner* — Todd L Barker
(74) *Attorney, Agent, or Firm* — Posz Law Group, PLC

(57) ABSTRACT

A functionality is adapted to a client and server combination. Responsive to a request of a client for a functionality, pre-configured properties of the client, requested functionality, and a server on which the functionality is run are retrieved. An availability check is performed, based on the retrieved pre-configured properties of the client, server, and requested functionality, to eliminate properties of the functionality which are not capable of functioning on the client-server combination. The result of the availability check is provided as a set of properties which is available for the requested functionality to run on the client-server combination. The pre-configured properties define different property types, property values of the different property types, functionality values for each property value, and rules that instruct a processor how to perform the availability check based on the property types, the property values and the functionality values.

20 Claims, 22 Drawing Sheets

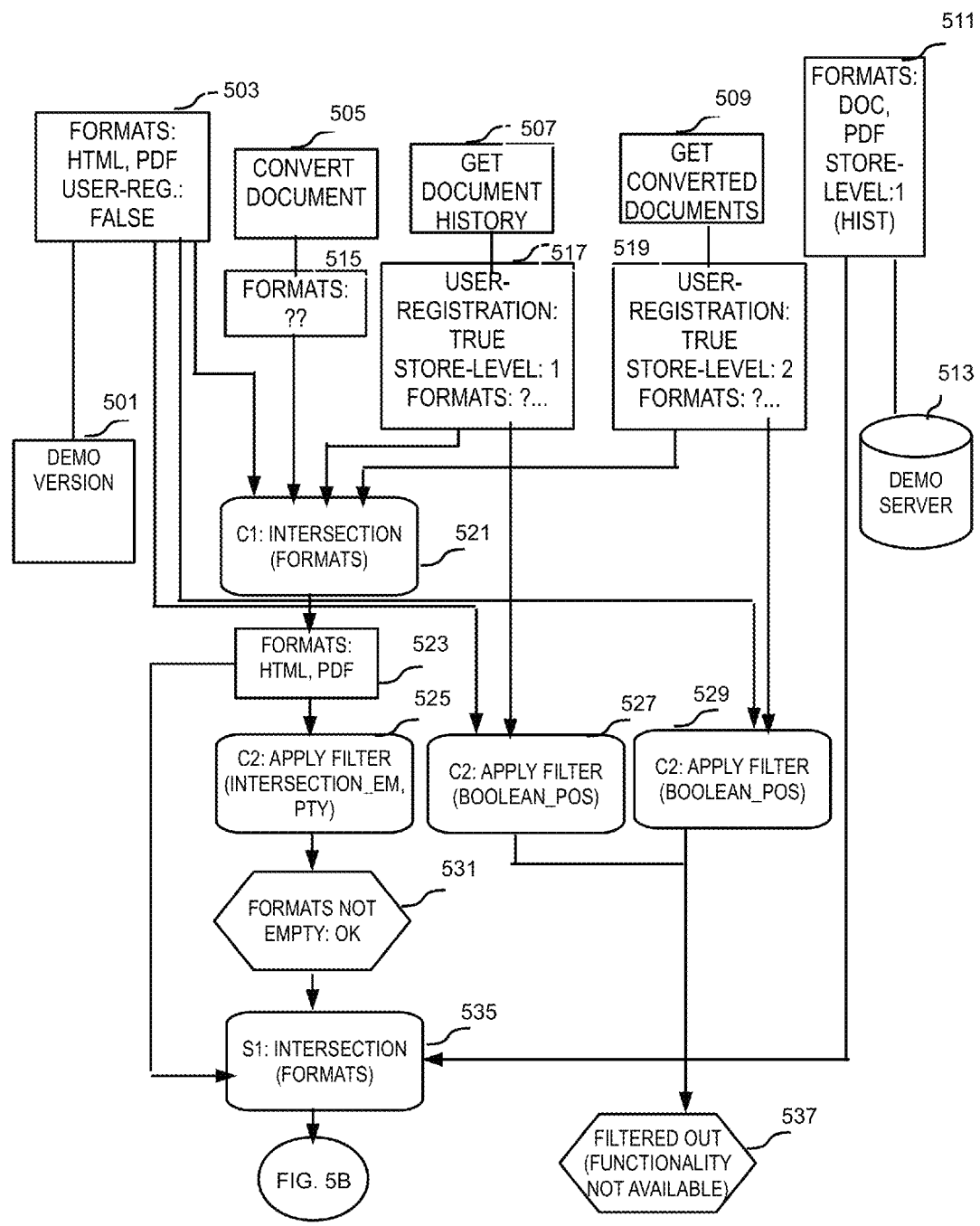

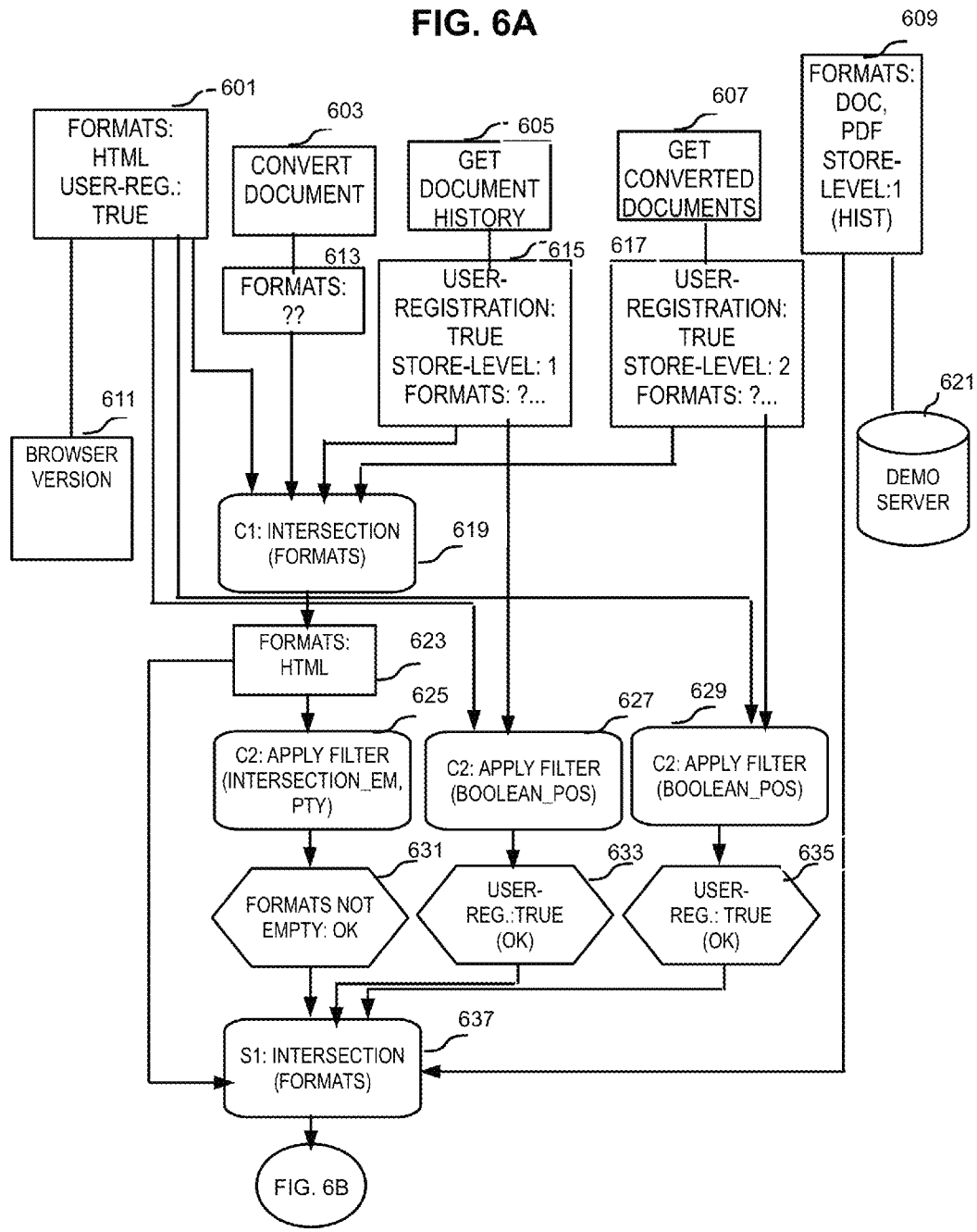

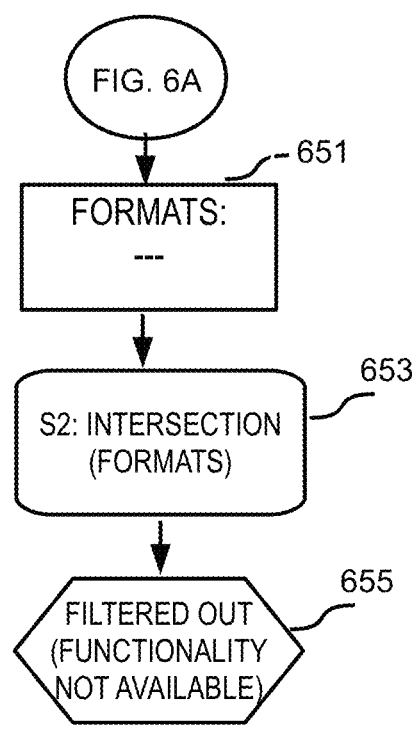

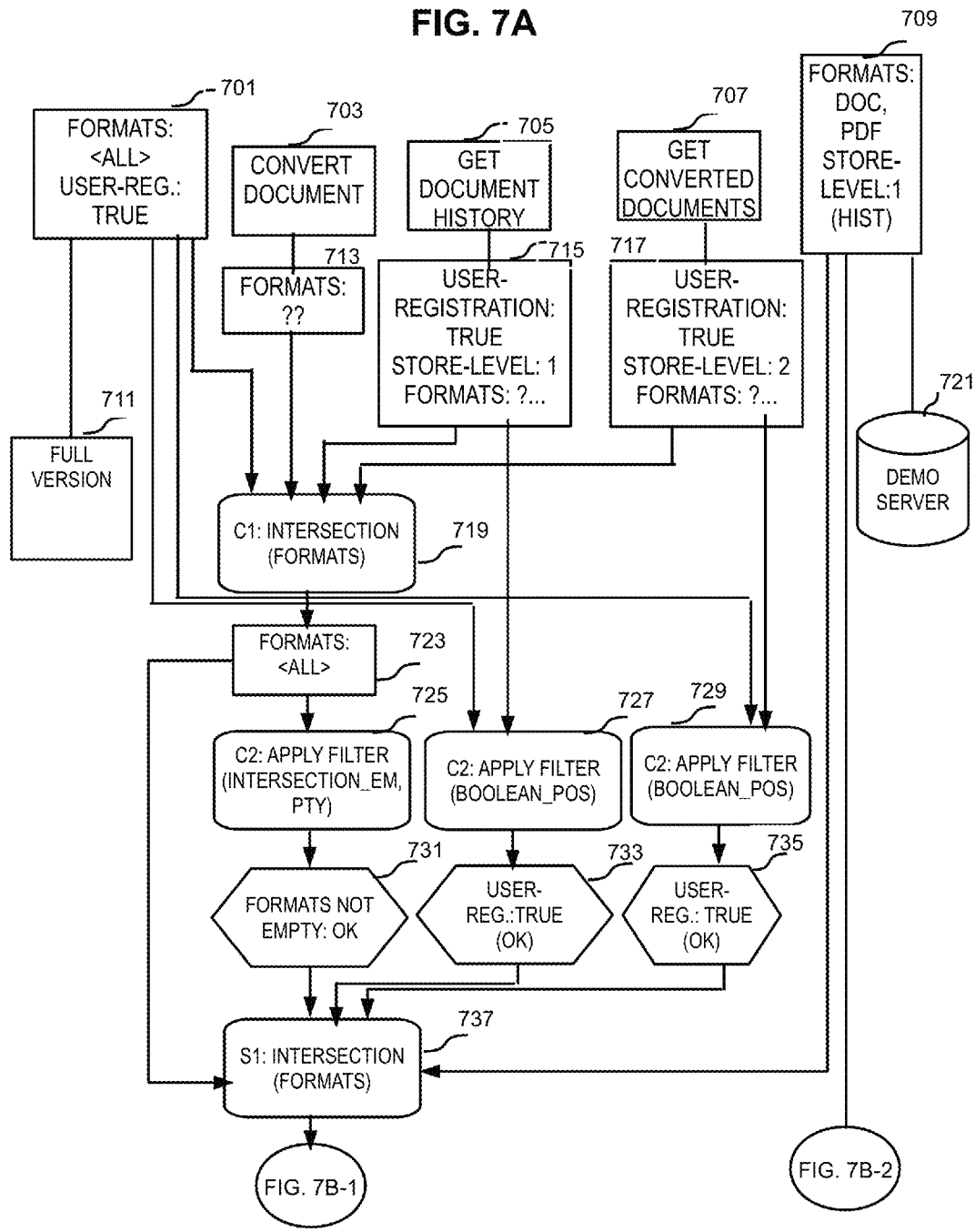

FIG. 14

Table 1:

| Client | | Functionality | Filter/Adapter | Rule |
|---|---|---|---|---|
| Property | Property value | Functionality value* | Action | |
| Write allowed | true | True (needed) | Allow + use write mode API | Boolean (NEG) |
| | | False (not needed) | Allow without restriction | |
| | false | True | Filter out | |
| | | False | Allow + use read-only mode API | |
| Model/object type restriction | Type A,B | B,C,D | Use intersection: Allow if intersection not empty, else filter out. | Type INTERSECTION |
| Perspective | Function rights A,B | A and B and C | Filter out (not enough rights) | Type AND |
| | | A | Allow | |
| | Level n | <=n | Allow. Only server functionality level <=n available. | Value <= |
| | | >n | Filter out | |
| | Topic BPA_EX | Topic BPA or BPA_EX or SAP | Allow. Only server functionality BPA_EX available. | Type INTERSECTION |
| | | Topic UML | Filter out | |
| | | Topic BPA-EX | Allow. Only server functionality BPA_EX available. | |
| Can display dialogs | true | True (has dialogs) | Allow | Boolean (NEG) + allow if default |
| | | False (no dialogs) | Allow | |
| | False | True (has dialogs) | Filter out | |
| | | True (+client or functionality(?) provides default values) | Allow (+use defaults) | |
| | | False | Allow | |
| Supported output formats | Type A, B, C | Type B,C | Use intersection: Allow if intersection not empty, else filter out. | Type INTERSECTION |
| Client version | n | m | Allow if n=m. | Value == |
| Response time requirements | n | m | only reports with response time m<=n will be offered | Value <= |
| Regional settings | Client region | Supported regions | Use intersection: Allow if intersection not empty, else filter out (or use fallback?). Use regional settings. | Type INTERSECTION |
| License | Permission A, B, C | A and B required | Allow. | Type AND |
| | | C and D required | Filter out (not enough permissions) | |
| Accessibility 1: Font Size | Font size | - | Adapter: use specified base font size | |
| Accessibility 2: Export models as text | true | True (supported) | Allow and use "models as text" output feature | Boolean (POS) |
| | | false | Filter out | |
| | false | True (supported) | Allow. | |
| | | false | Allow. | |

*functionality is defined to need this

FIG. 15

Table 2:

| Server | | Functionality | Filter/Adapter | Rule |
|---|---|---|---|---|
| Property | Property value | Functionality value* | Action | |
| Write allowed | true | True (needed) | Allow + use write mode API | Boolean (NEG) |
| | | False (not needed) | Allow without restriction | |
| | false | True | Filter out | |
| | | False | Allow + use read-only mode API | |
| Can handle dialogs | true | True (has dialogs) | Allow | Boolean (NEG) + allow if default |
| | | False (no dialogs) | Allow | |
| | False | True (has dialogs) | Filter out | |
| | | True (+server or functionality(?) provides default handling) | Allow (+use defaults) | |
| | | False | Allow | |
| Supported output formats | Type A, B, C | Type B,C | Use intersection: Allow if intersection not empty, else filter out. | Type INTERSECTION |
| Available memory | n | m | only reports with memory m<=n will be offered | Value <= |
| License | Permission A, B, C | A and B required | Allow. | Type AND |

FIG. 16

Table 3, C1, S1:

| Property type | Filter rule | Result | Description |
|---|---|---|---|
| Types | INTERSECTION | Reduced list of types | The list of types offered by the functionality is reduced by intersection with available types of client/server properties |

FIG. 17

Table 4, C2, S2:

| Property type | Filter rule | Result | Description |
|---|---|---|---|
| Boolean | POS | filter out if true->false | The functionality is not available if client/server property value is TRUE and functionality's value is FALSE. |
| | NEG | filter out if false->true | The functionality is not available if client/server property value is FALSE and functionality's value is TRUE. |
| | (NEG) with special handling of defaults(*) | rule can be overwritten by providing a default | If functionality value is TRUE and the functionality or client/server provides a default behavior, the functionality is not filtered out |
| Types | INTERSECTION EMPTY | Filter out if list is empty. | The functionality is not available if the residual type list is empty. |
| | AND | all types needed by the functionality must be provided by client/server | The functionality is not available if client/server property value is FALSE and functionality's value is TRUE. |
| Value | =, <, > | if condition is true, we accept | The functionality's value is compared to the client/server's value |

FIG. 18A

XML SCHEMA:

```
<xs:complexType name="property-type">
  <xs:choice>
    <xs:element name="boolean-property" type="boolean-type"/>
    <xs:element name="types-property" type="list-type"/>
    <xs:element name="value-property" type="value-type"/>
  </xs:choice>
</xs:complexType>

<xs:complexType name="boolean-rule">
  <xs:restriction base="xs:string">
    <xs:enumeration value="POS" />
    <xs:enumeration value="NEG" />
  </xs:restriction >
</xs:complexType>

<xs:complexType name="boolean-type">
  <xs:attribute name="value" type=" xs:boolean"/>
  <xs:attribute name="rule" type="boolean-rule"/>
</xs:complexType>
```

FIG. 18B

```xml
<xs:complexType name="list-rule">
  <xs:restriction base="xs:string">
    <xs:enumeration value="AND" />
    <xs:enumeration value="INTERSECTION" />
  </xs:restriction>
</xs:complexType>

<xs:complexType name="list-type">
  <xs:attribute name="value" type="types"/>
  <xs:attribute name="rule" type="list-rule"/>
</xs:complexType>

<xs:simpleType name="types">
  <xs:list itemType="xs:string"/>
</xs:simpleType>

<xs:complexType name="value-rule">
  <xs:restriction base="xs:string">
    <xs:enumeration value="EQ" />
    <xs:enumeration value="LT" />
    <xs:enumeration value="LE" />
    <xs:enumeration value="GT" />
    <xs:enumeration value="GE" />
  </xs:restriction>
</xs:complexType>
```

FIG. 18C

```
<xs:complexType name="value-type">
    <xs:attribute name="value" type="xs:float"/>
    <xs:attribute name="rule" type="value-rule"/>
</xs:complexType>
```

METHOD AND SYSTEM TO ADAPT FUNCTIONALITY TO CAPABILITIES OF CLIENT AND DATA STORAGE

TECHNICAL FIELD

The technical field relates in general to functionality control in a client/server infrastructure.

BACKGROUND

When a client wants to call a server, the executing application usually has to perform certain checks to see whether the client has sufficient access rights and whether the specific server has the appropriate capabilities or is even suitable for certain functionality.

Usually, this is a tedious validation task for an application. But, not only must the security restrictions be checked, but also the capabilities, preferences, environment, etc. influence the decision as to whether the client has access and capabilities. Moreover, a specific characterization is easily forgotten.

A conventional authorization check and Access Control List (ACL) provides for a mathematical intersection of the clients rights against the servers capabilities. However, an ACL is not flexible.

In WO 2008015398, the author describes a method of web service selection without (much) user intervention. This is mainly a selection by relevance, but no configuration or mediation. EP 2012490 A1 discloses a middleware to find a server/servers out of a pool which provide the functionality needed by a client request. Scientific articles or patents may describe a method of web service which is mainly a selection by relevance without configuration or mediation; or middleware that finds one or more servers from a pool, to provide the functionality needed by client request. None of these addresses the problems noted above.

SUMMARY

Accordingly, one or more embodiments provide a computer system that adapts a functionality to a client and server combination. A processor is configured to retrieve, responsive to a request of a client for a functionality, pre-configured properties of the client, pre-configured properties of the requested functionality, and pre-configured properties of a server on which the requested functionality is run. The processor also performs an availability check, based on the retrieved pre-configured properties of the client, pre-configured properties of the server, and pre-configured properties of the requested functionality, to eliminate properties of the requested functionality which are not capable of functioning on a combination of the client and the server. The processor also provides the result of the availability check as a set of properties which is available for the requested functionality on the combination of the client and the server. The pre-configured properties define different property types, property values of the different property types, functionality values for each property value, and rules that instruct the processor how to perform the availability check based on the property types, the property values and the functionality values.

In another embodiment, the processor enables execution, on the combination of the client and the server, of the requested functionality, the execution being limited to the set of properties which is the result of the availability check.

In still another embodiment, the availability check incorporates a four-pass filter. The processor will perform the four-pass filter. The rules include intersection rules and non-intersection rules. In a first client filter, intersection rule preprocessing is performed to reduce functionality properties to properties of the client. In a first server filter, intersection rule preprocessing is performed to reduce functionality properties to properties of the server. In a second client filter, performed after the first client and server filters, the requested functionality is removed when the requested functionality is determined to be not compatible with the client properties. In a second server filter, performed after the first client and server filters, the requested functionality is removed when the requested functionality is determined to be not compatible with the server properties.

In still a further embodiment, the availability check is performed prior to connecting the client to the server for the requested functionality.

In yet another embodiment, the pre-configured properties further comprise actions that instruct the processor as to which of the pre-configured properties to allow and to filter out based on the results of application of the rules, and the processor is configured to perform the actions as part of the availability check.

In still another embodiment, the pre-configured properties of the client, the pre-configured properties of the server and the pre-configured properties of the requested functionality are defined using an XML schema consistent with the XML schema for client, server and functionality.

Another embodiment provides a method that adapts a functionality to a client and server combination.

One, or a combination of more than one, or all, of the above embodiments, can be combined and provided as a single embodiment.

Another embodiment provides a method according to the above that adapts a functionality to a client and server combination.

Yet another embodiment provides a non-transitory computer-readable medium which can perform a method according to one or more of these embodiments.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 5A to FIG. 5B is a functional flow diagram illustrating one of the client-server combinations of FIG. 4;

FIG. 6A to FIG. 6B are a functional flow diagram illustrating another one of the client-server combinations of FIG. 4;

FIG. 7A to FIG. 7B are a functional flow diagram illustrating still another one of the client-server combinations of FIG. 4;

FIG. 14 is a table illustrating filtering rules for each property (client);

FIG. 15 is a table illustrating filtering rules for each property (server);

FIG. 16 is a table illustrating extracted rules for client 1, server 1;

FIG. 17 is a table illustrating extracted rules for client 2, server 2; and

FIG. 18A to FIG. 18C is an XML schema for defining properties of the client, server and functionality, referred to as "XML schema for client, server and functionality."

DETAILED DESCRIPTION

Figure 1:
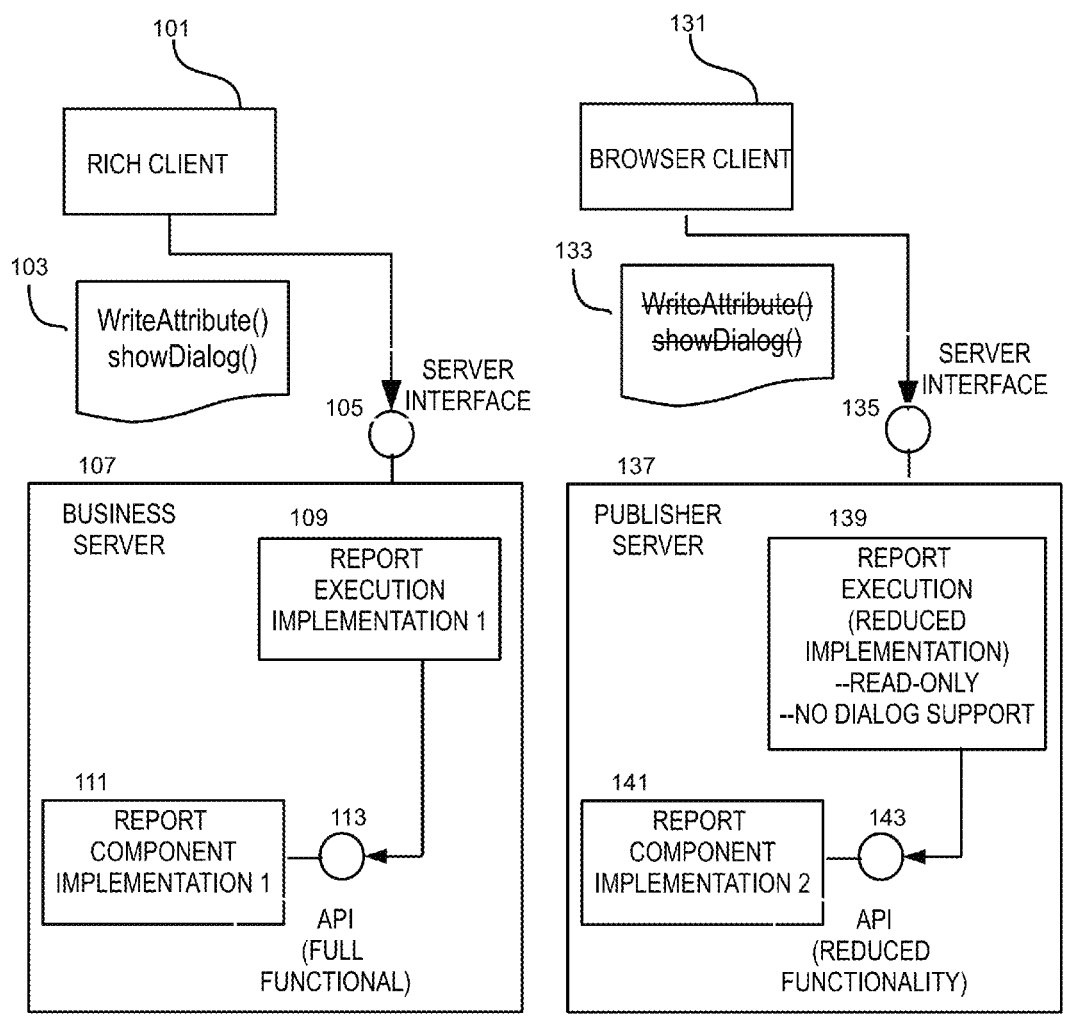
FIG. 1 is a functional flow diagram illustrating individually adapting functionality for scenarios.

In overview, the present disclosure concerns functionality in a client/server infrastructure, for example in social networking, mobile applications, big data/information applications, collaboration, and cloud computing, used in connection with document access and management, data access and/or management, report generation, and/or execution of applications, dialogs and/or user interfaces, in which a functionality has required properties (some of which are alternatives) to be able to execute; different kinds of clients that use the functionality have different capabilities (for example, application, browser, demo, etc. which may have e.g., read-only functionality vs. full rights and capabilities); and any of the clients can try to execute the same functionality on different servers; and each of the different servers on which the client tries to use the functionality may have different capabilities. A layer of abstraction relating to both client and server side capabilities and a common set of generalizable properties corresponding to each of the functionalities results in providing only the functionality and its properties capable of functioning on the particular combination of client and server capabilities, so that the functionality itself does not have to be adapted to each combination of client-server capabilities. More particularly, various inventive concepts and principles are embodied in systems, devices, and methods therein resulting in determination of functionality properties for a functionality used by the client for a particular client-server combination, depending on the client's and the server's capabilities (properties), by reviewing client properties (sometimes referred to herein as capabilities), server properties (sometimes referred to herein as capabilities), checking availability, and adapting behavior of the functionality.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

<Definitions>

The claims may use the following terms, which are defined to have the following meanings for the purpose of the claims herein. Other definitions may be specified in this document.

The term "computer system" or "computer" used herein denotes a device sometimes referred to as a computer, laptop, personal computer, personal digital assistant, notebook computer, personal assignment pad, server, client, mainframe computer, or evolutions and equivalents thereof; and to a computer-processor-enabled electronic device with electronic display which employs a graphical user interface to interact with a user.

<End of Definitions>
<Glossary>

Report: sealed piece of code with certain properties which may display dialogs and create output files Functionality: In our case, a report. But generally this is an encapsulated functionality that can be offered as functional block, for example as a menu entry in an application or as a web service.

Extension: part of implemented server functionality which is only responsible for a special topic or use-case (Ex: Versioning, Simulation, Admin)

Topic: (in context of ARIS) user's field of interest

ProcessLive fact sheet: A text representation of a (business) process, modeled by a user in ARIS.

<End of Glossary>>

In overview, one or more embodiments can, among other things, provide a solution, which offers a much broader capability than only a conventional mathematical intersection of the clients rights against the servers capabilities (how this is usually handled with authorization checks and Access Control Lists). Before connecting a client to a server, an extended Availability Check can be performed, using pre-configured properties of the client and the server. A feature of an embodiment is the idea that a definition of the property that not only contains specific keys and values, but also tells the controller how to perform the check. In addition, the algorithm to generically compare and match arbitrary properties can also involves a four-pass-filter that is explained in detail.

As further discussed herein below, various inventive principles and combinations thereof are advantageously employed to provide a major advantage in coding these client/server scenarios. It can be much more flexible than the usual ACL evaluation and can be extended without changing the programming code.

Further in accordance with exemplary embodiments, an aspect is the definition of the property objects, which can be enhanced with certain property evaluation types. And secondly, the filtering process, for example, a 2×2 filtering process (2 filters at the client request and 2 filters for the server's capabilities) can provide a unique way to process the availability check.

Accordingly, enabling the direct configuration of certain objects can be beneficial, because the customer may have a better influence on the behavior of a product; the process can become more transparent.

1. INTRODUCTION

The intention for the innovation was triggered by the fact that we have two different server implementations of the same API, but one server only allows read-only access to the data, the other allows full access to the same data.
On the other hand we have different client types. One can display dialogs, one cannot. One is only allowed to run a read-only functionality, another has full rights.

Conventionally, the functionality must be adapted individually in the code for each of these possible scenarios (see FIG. 1). In the future it is possible to have more different scenarios or even combinations of them.

Figure 2:
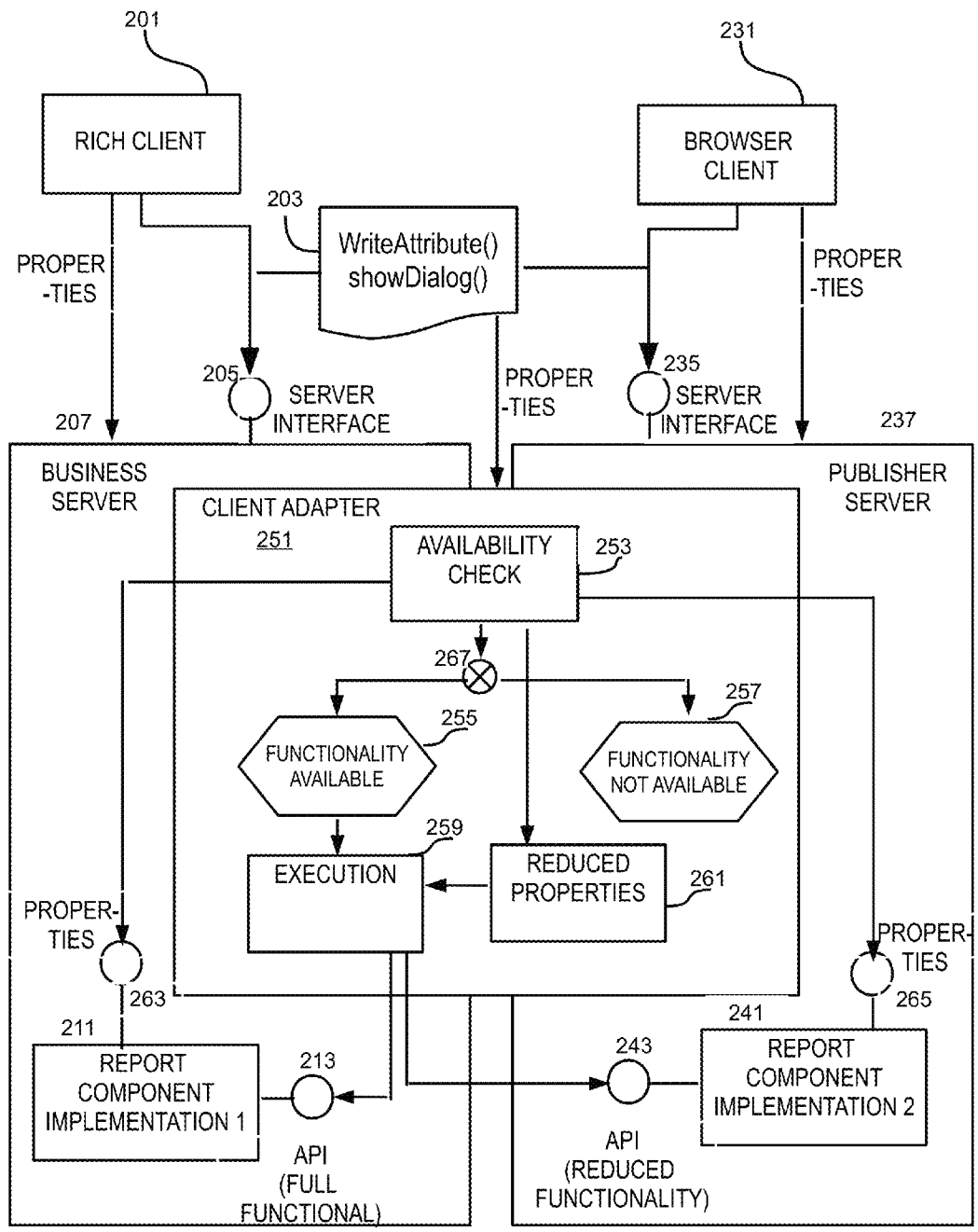
FIG. 2 is a functional flow diagram illustrating an adapter that generically adapts functionality for scenarios.

Therefore the inventors thought about how this could be done in a more generic way and if there were even more differences to consider having different client or server types (see FIG. 2).

Generally speaking, if different kinds of clients (application, browser, mobile device) execute the same functionality on a server, the result sometimes must be different, depending on the client's capabilities. For example a mobile device normally cannot display EXCEL files, but displays HTML quite well.

On the other side, also server capabilities can influence the behavior of a client-offered functionality. For example write access to data or read-only access.

What is needed is a layer of abstraction on both sides and a common set of generalizable properties, which are fulfilled on one and the other side and a generic implementation which brings the 3 sides (functionality, client, server) together.

In this document an embodiment is described for "reports" (=encapsulated blocks of functionality creating a document), but it can be generalized to other client-server situations, for example for Web Services.

2. STATE OF THE ART

In the example of FIG. 1, the same functionality 103, 133 is to be executed in different environments, which behave differently. One example is the rich client 101, which is fully functional concerning report execution, but the browser client 131 cannot display dialogs that pop up during a report execution. Another example is the "Business Server" 107, which is fully featured as well, but the "Publisher Server" 137 allows only read-only access to database content. The servers 107, 137 accessed via respective server interfaces 105, 103. Consider that there may be two completely different, independent report component implementations 111, 141 for what is essentially the same product, which access only the same report execution interface (with the different implementations). Decisions as to whether functionality can be executed and how the semantics is, are hard-coded inside each environment, as a proprietary implementation for each client type and for each different constellation: report execution implementation 109, and report execution with reduced read-only-no dialog support 139. Of course, this is a simple example which is representative of the problem which becomes geometrically more complex.

Hard-coded functions return which functionalities are available 103, 133 for the rich client 101 and the browser client 131. Only user documentation knows which methods are allowed to be used in server environment A (Business Server) or in environment B (Publisher Server). The functionality must (in a worst case) be adapted to be aware of all environments, which is error-prone. In a situation that one of the clients calls a method which is not allowed in the current environment, an exception is thrown or quietly "nothing" is performed (no feedback).

Conventionally, for each new client type, all relevant server calls have to be checked manually or (in a worst case) server functionality has to be copy/pasted and adapted with regard to, e.g.:
dialogs supported by client
supported file formats
functional rights (viewer client vs. "modifier" client)
Different server types typically have the same API interface, but different implementations may have partly unknown behavior, such as with respect to:
different teams
undocumented exceptions
missing implementations ("to-do", "no such method exception")
own copied interfaces
missing interfaces

3. CONCEPT

Considering the example of FIG. 1, a solution as illustrated in FIG. 2 is proposed. In the example of FIG. 2, different kinds of clients (here represented by rich client 201, and browser client 231) execute, via the server interfaces 205, 235, the same functionality 203 on different server types (here represented by business server 207 and publisher server 237). The functionality itself does not have to be adapted anymore. The result sometimes will be different, depending on the client's and the server's capabilities (properties).

Generally speaking, there are four different areas, we will look at in detail:
Client properties (from rich client 201 and browser client 231)
Server properties (capabilities) 263, 265
Availability check 253
Adaption of behavior 251

3.1 Properties

The client and server properties are domain specific and are specifically arranged for each application system.

Beginning with an example, the term "properties" is explained, and the properties are categorized to define a generic approach.

3.2 Example 1

Domain: ARIS Report 3.2.1 Client Properties

Here are samples for client properties from clients 201, 231 that relate to the report execution functionality:
Write allowed
  The client is allowed to modify data
    If not:
      only "reading" reports are returned to be executed
      server API is restricted to read-only mode
Type restriction
  The client is restricted to display only a subset of possible model or object types Samples:
    dedicated ARIS model and object types only
    mobile device which can only see/edit a "function" objects
Perspective
  A perspective defines the user experience level and his individual assigned functionality
  User experience/function rights
  Read-only, write, administrate, high-level functionality
  Special features allowed ("topics")
    make only those report extensions available that are allowed by topic/user experience
    example: "viewer" user should not use "simulation", "script admin" interfaces
Can display dialogs
  The client is able to show pop-up dialogs
    If not
      Alternative 1: Reports which show dialogs cannot be execute
      Alternative 2: A "Dialog Data Provider" returns default values if dialogs cannot be displayed
Supported output formats
  Which specific output formats out of a list are supported by a device (PDF, DOC, XLS, RTF, . . . )
Client version
  Potential different behavior of the functionality for different client versions
Response time requirements
  Can be specified in T-shirt sizes S, M, L, XL
    only functionality with response time<x will be offered
Regional settings (Locale)
  Locale-specific formatting like currency, language (incl. L to R), . . .
Accessibility requirements
  font sizes
  images as text (ex: process description)
License restrictions
  A functionality is offered or not, depending on the user's license
    license covers only functionality A, but not B, C
3.2.2 Properties (Capabilities) of Server/Data Storage Here are samples for server properties 263, 265, corresponding to their respective servers 207, 237, that relate to the report execution functionality:
Can handle dialogs
  Does the server contain APIs for defining and executing dialogs which are to be shown on a client Supported output formats
  Which specific output formats out of a list can be produced by the server (PDF, DOC, XLS, RTF, . . . )
Available memory, specified in GB (+ other resources)
  The available memory of a server may be a criterion, whether a functionality with a certain memory consumption can be executed or not, or how many "smaller" functionalities can be executed in parallel
Data access
  What kind of data access does the server allow?
  Examples:
    Server operates on an older version of versioned data (which is not allowed to be modified any more)
    The server operates on external data which allows only read-only access
    The server has full access to the data (read/write/delete)
    The server offers access levels (limited read/write access), so each function is assigned to a certain access level:
      Group functions to access levels
      Select whether allowed or not
      Example: Changing properties (attributes) is allowed but creation of new models or objects is forbidden
  License restrictions
    A server-side functionality is offered or not, depending on the user's license
    license covers only functionality A, but not B, C
3.3 Availability Check: Define Availability by Filtering In a first step, the offered functionality 203 is reduced by an intersection 267 of its properties with client and server property restrictions. This takes place in a row of different substeps.

Result: offer only functionality blocks that are supported by both sides 3.3.1 Filter "C1"—Reduce Functionality Properties to Client's Properties (Intersection Rule Preprocessing)
  Reduce functionality-properties to the client-properties
  Reduce output formats to/with output formats of client
3.3.2 Filter "C2"—Reduce Valid Functionality-Properties Using Client Properties Removes all functionalities which are incompatible with capabilities of the client, as reflected by not belonging to the client properties:
  Write not allowed: Remove all writeable functionalities
  Perspective>client-perspective
  Dialogs not supported and no DialogDataProvider: remove all functionalities with dialogs
  Response time too slow: Remove such functionalities
  if no output format: Remove this functionality completely (except for those which are defined not to create output)
3.3.3 Filter "S1"—Reduce Functionality Properties to Server's Properties (Intersection Rule Preprocessing)
  Reduces functionality's properties to the server-properties:
  Reduce output formats to output formats of server
3.3.4 Filter "S2"—Reduce Valid Functionalities Using Server Properties
  Reduces concerning the server-properties:
  write allowed but server read-only: Remove functionality
  Client supports dialogs
    but server not: Remove functionality
    Server supports "DialogDataProvider" which provides a default: functionality stays available
  Needed memory>available memory: Remove functionality if no output format: Remove this functionality completely (except for those which are defined not to create output)

The result of the application of these filters is a reduced number of functionality blocks, each with a possibly reduced property set. See FIG. 3, functionality blocks referred as "Reports" in this example.

Figure 3:
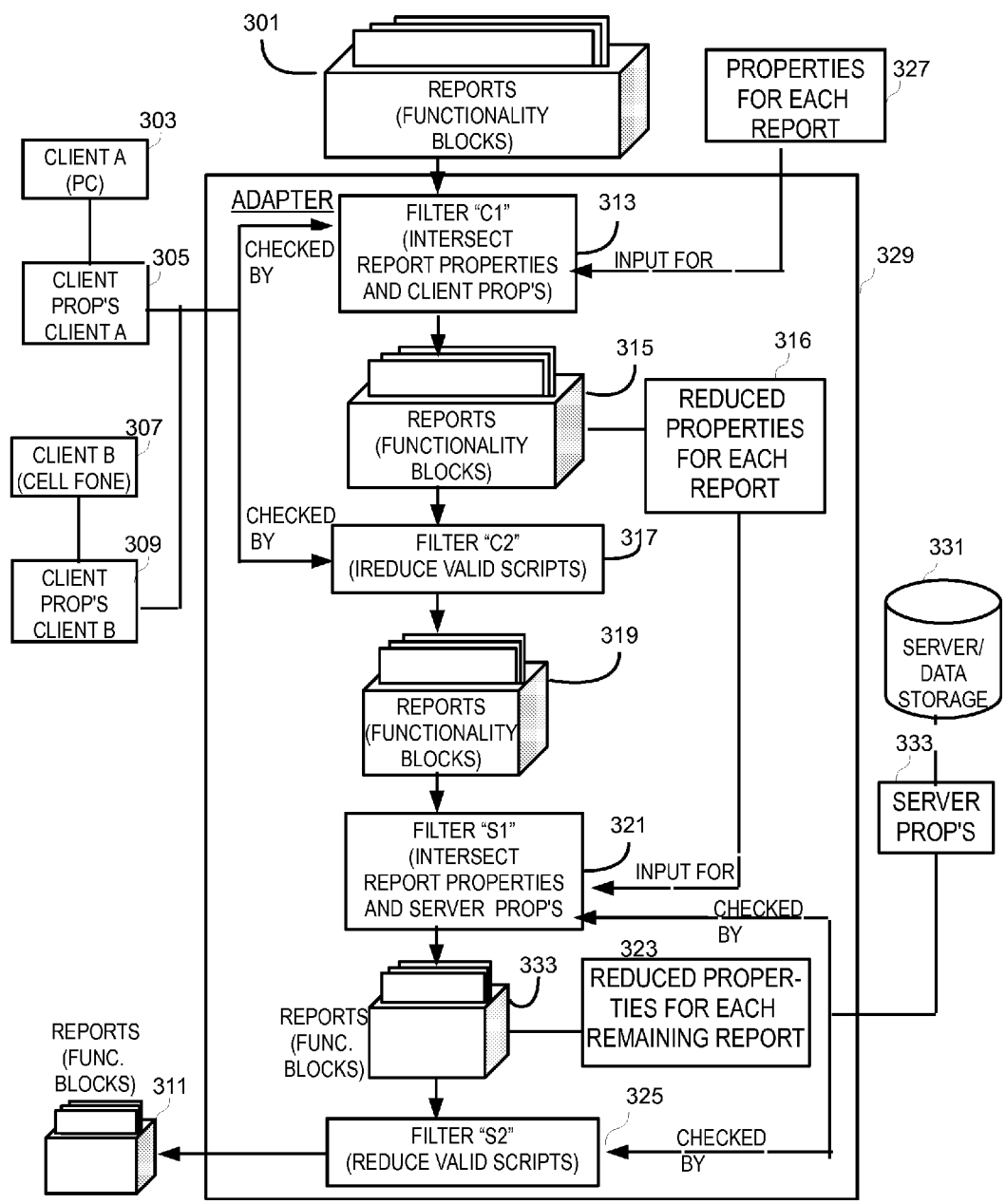
FIG. 3 is a functional flow diagram illustrating filters.

Referring now to FIG. 3, a functional flow diagram illustrating filters will be discussed and described. In FIG. 3, functionality blocks for reports 301 and functionality properties corresponding to each report 327 as well as client properties 305 of client A 303 are input to filter "C1" 313. In this example, client A 303 is a personal computer. Also, functionality blocks for reports 301 and functionality properties for each report 327 as well as client properties 309 of client A 307 are input to filter "C1" 313. In this example, client B 307 is a cell phone.

Client filter "C1" 313 performs an intersection of the report functionality properties with one client's properties, 305 or 309, to generate reduced properties for each report 316. Note that the result from the client filter "C1" 313 is a set of reports (functionality blocks) 315 which has been reduced in comparison to the original functionality blocks for reports 301.

Client filter "C2" 317 reduces the valid scripts with respect to the one client's properties, 305 or 309. The result from the client filter "C2" 317 is a set of reports (functionality blocks) 319 which has been further reduced. The functionality blocks which has been reduced by filters C1 and C2 is provided to server filter S1 321 which intersects report functionality properties and server properties 333 from the server/data storage 331, to provide a set of reports (functionality blocks) 333 which result in reduced properties 323 for each remaining report. The resulting set of reports 333 is input to server filter S2 325 together with the server properties 333 from the server/data storage 331; server filter S2 325 will reduce the valid scripts. The server filter S2 then provides the resulting set of reports 311 which are appropriate for the specific combination of client properties, server properties, and functionality properties.

This means a client adapter 251 will be useful, which covers all client and server properties and is able to not only perform this filtering but also device what each property means for execution.

3.4 Adaption of Behavior

This step is about the change of behavior of a functionality, depending on client properties and server capabilities.
Decide how the functionality is
Offered
    Offer either full or reduced functionality (see section 4.5.1 Access Levels).
Executed
    Individual adaptions depending on a fixed set of properties (See section 4.5 Adapt behavior)
This behavior depends on the property. As an example we describe such decisions for the properties mentioned above.

3.5 Example 2

A Document Converter Application

Figure 4:
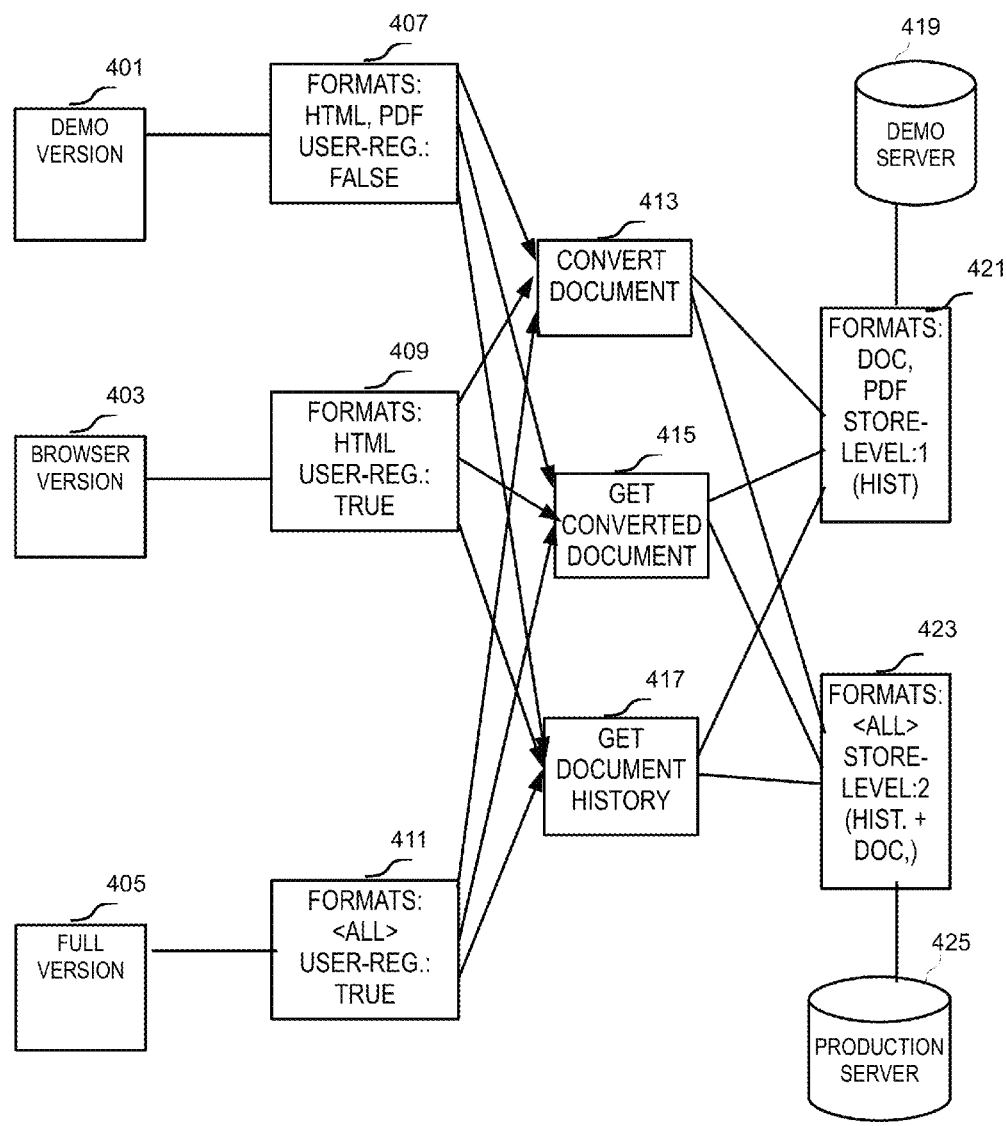
FIG. 4 is a functional flow diagram illustrating a document converter application, here with three different client types, two different server types, and three functionalities which have to negotiate which functionality is really available in different client-server combinations.

Referring now to FIG. 4 a functional flow diagram illustrating a document converter application, here with three different client types, two different server types, and three functionalities which have to negotiate which functionality is really available in different client-server combinations, will be discussed and described. FIG. 5A, FIG. 5B, FIG. 6A, FIG. 6B, FIG. 7A and FIG. 7B are representative combinations of these. In this example we want to describe the entire process with the example of a document converter, which offers only two functionalities. Depending on the used client or server, we will see that we have different system behavior.

Functionalities:
1. convert documents 413
2. request converted document 415 and
3. get document history 417 for a user In the example of FIG. 4, there are provided three different clients, each with different combinations of capabilities:
1. Demo version 401: no user registration, can convert only from and to HTML and PDF (capabilities 407)
2. Browser version 403: user registration, can only display HTML (capabilities 409)
3. Full version 405: can do everything (capabilities 411)

This example also assumes two different servers with their own different combinations of capabilities:
1. Demo server 419, with capabilities 421:
   can only convert from/to DOC and PDF format
   does not store documents
   only stores that a user has converted something (store level 1)
2. Production server 425, with capabilities 423:
   can convert any format
   has a database which stores all converted documents per user (store level 2)

Depending on the combination of client and server which is used, the functionality behaves completely different.

Examples:
   on the demo server 419, the demo version 401 can only produce PDF and the results are not stored, so requesting a converted stored document will not be available (see FIG. 5A-5B, discussed below).
   on the production server 425, the demo version 401 can create PDF and HTML, but they are also not stored, because of lacking user information in the demo version of the client. So requesting any converted stored document will also not be available
   the browser 403 can only create HTML, so none of the functionalities will be available when using the demo server 419 which does not have HTML capability (see FIG. 6A-6B, discussed below).
   on the demo server 419, the full version 405 can create DOC and PDF, but requesting the converted documents will only return an overview but not the content (because it is not stored) (see FIG. 7A-7B, discussed below).
   on the production server, the full version is fully functional without restrictions The system filters in two steps, first for all properties with applied rule "intersection", the intersection is created (C1, S1). Then for all properties the rest of the rules are applied. If one rule has the result that the functionality is not available for the client-server combination, then the processing stops for this functionality.

The "work set"-properties of each functionality are the result of the rule processing.

Figure 5B:
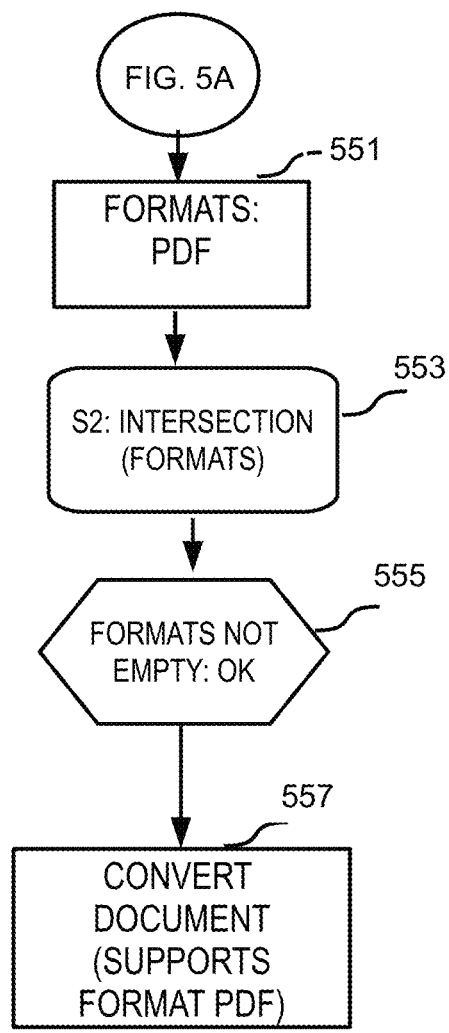

Referring now to FIG. 5A to FIG. 5B, a functional flow diagram illustrating one of the client-server combinations of FIG. 4 will be discussed and described. Here, in the combination of "demo version" client 501 and "demo server" 513: functionalities 507, 509 turn out to be not available and formats 503, 511, 515 of a functionality 505 are reduced to PDF. The demo version 501 has capabilities/properties 503: formats of HTML, PDF and user-registration of false (discussed above). The demo server 513 has capabilities/properties 511: formats of DOC and PDF, and store-level 1 (history). The functionalities which are provided are to convert document 505, which specifies any formats 515; get document history 507, which requires 517 user-registration of true, and store-level 1, and some formats; and get converted documents 509, which requires user-registration of true, store-level of 2, and some formats.

Client filter C1 521 performs the preprocessing, in this case, an intersection of the formats 503, 511 of the client 501 and each property 515, 517, 519 of the functionalities 505, 507, 509. The client filter C1 521 provides the resulting formats 523, here, HTML and PDF.

Then, client filters C2 525, 527, 529 performs further processing to apply client filters to each of the functionalities, in this case, for the convert document functionality 505 applying a filter to the intersection (of the formats) 525; for the get document history functionality 507, applying a filter to the Boolean-positive (user-registration: true) 527; and for the get converted documents functionality 509, applying a filter 529 to the Boolean-positive (user-reg.: false). The client filter C2 527, 529 results in filtering out capabilities which are not available 537, here because the demo version 501 has a user-registration of false and the get document history 507 and get converted documents 509 functionalities require user-registration of true. The client filter C2 525 which was applied to the intersection results in a decision 531 that formats not empty are OK.

Then the server filter S1 535 performs an intersection with the intersection results (which are the client capabilities/functionality formats) and the server formats. The resulting format 551 in this example is PDF.

Then, the server filter S2 553 applies filters to each of the remaining capabilities from the intersection results; and then as a result the convert document functionality 557 is determined to support the format PDF and it is also determined that formats are not empty 555, for this client-server combination.

Referring now to FIG. 6A to FIG. 6B, a functional flow diagram illustrating another one of the client-server combinations of FIG. 4 will be discussed and described. Here is discussed the combination of a "browser version" client 611 and "demo server" 621; functionality is filtered out (not available) 655. The browser version 611 has capabilities 601: formats of HTML, PDF and user-registration of true (discussed above). The demo server 621 has capabilities 609: formats of DOF and PDF, and store-level 1 (history). The functionalities which are provided are to convert document 603, which has a property of any formats 613; get document history 605, which has properties that require 615 user-registration of true, and store-level 1, and some formats; and get converted documents 607, which has properties that requires 617 user-registration of true, store-level of 2, and some formats.

Client filter C1 619 performs the preprocessing, in this case, an intersection of the formats 601 of the client 611 and corresponding properties 613, 615, 617 each of the functionalities 603, 605, 607. The client filter C1 619 provides the resulting formats 623, here, HTML.

Then, client filters C2 625, 627, 629 perform further processing to apply client filters to each of the resulting capabilities, in this case, for the convert document functionality 603 applying a filter to the intersection (of the formats) 619; for the get document history functionality 605, applying a filter to the Boolean-positive (user-registration: true) 627; and for the get converted documents functionality 607, applying a filter 629 to the Boolean-positive (user-reg.: true). The client filters C2 627, 629 for the Boolean functionality properties results in passing through properties which are available 633, 635, here because the browser version 611 has properties of user-registration of true and the get document history 607 and get converted documents 609 functionality properties require user-registration of true. The client filter C2 625 which was applied to the intersection results in a decision 631 that formats not empty are OK.

Then the server filter S1 637 performs an intersection with the intersection results (which are the client/functionality formats) and the server formats. The resulting formats 651 are any type of formats.

Then, the server filter S2 653 applies filters to each of the remaining capabilities from the intersection, to filter out/pass through formats; and then as a result all of the functionalities are not available 655.

Figure 7B:
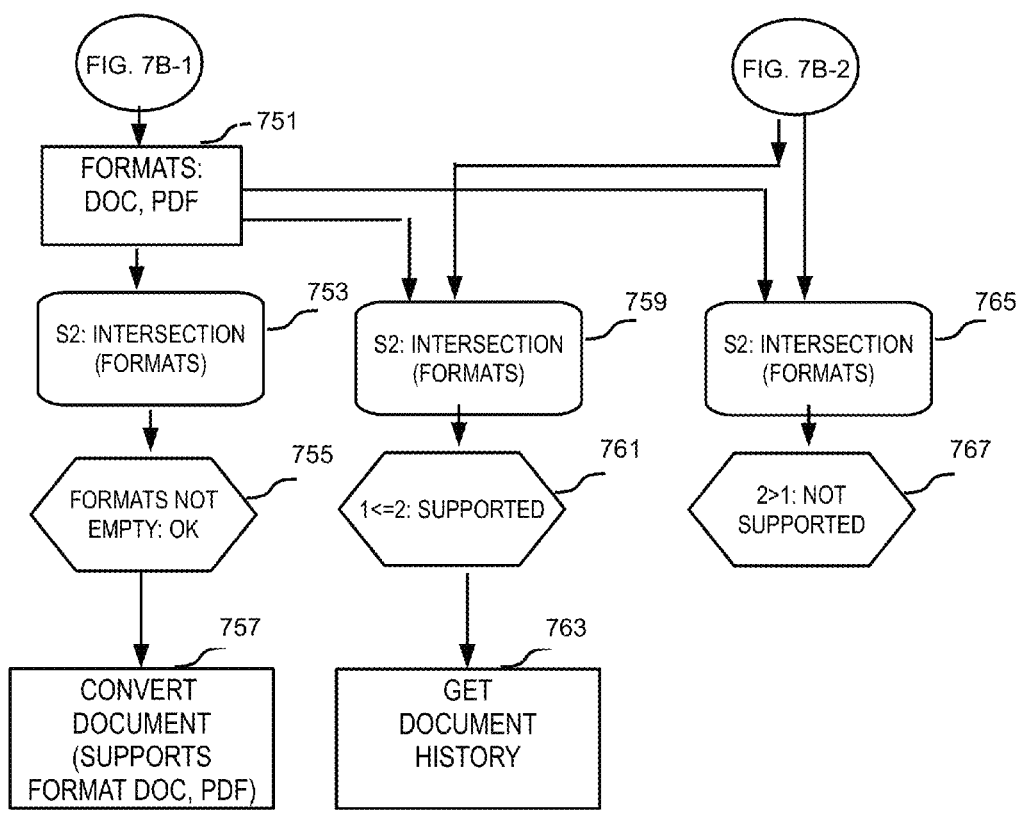

Referring now to FIG. 7A to FIG. 7B, a functional flow diagram illustrating still another one of the client-server combinations of FIG. 4 will be discussed and described. Here, the combination is "full version" client 711 and "demo server" 721; functionality "convert document" 703 and "get document history" 705 turn out to be available in this combination 757, 763. The full version 711 has capabilities 701: <all>formats and user-registration of true (discussed above). The demo server 721 has capabilities 709: formats of DOF and PDF, and store-level 1 (history). The functionalities which are provided are to convert document 703, which specifies functionality properties of any formats 713; get document history 705, which has functionality properties that require 715 user-registration of true, and store-level 1, and some formats; and get converted documents 707, which has functionality properties that require 717 user-registration of true, store-level of 2, and some formats.

Client filter C1 719 performs the preprocessing, in this case, an intersection of the formats 701 of the client 711 and functionality properties 713, 715, 717 of each of the functionalities 703, 705, 707. The client filter C1 719 provides the resulting formats 723, here, <all>.

Then, client filters C2 725, 727, 729 perform further processing to apply client filters C2 to each of the functionalities, in this case, for the convert document functionality 703 applying a filter to the intersection (of the formats) 719; for the get document history functionality 705, applying a filter 727 to the Boolean-positive (user-registration: true); and for the get converted documents functionality 707, applying a filter 729 to the Boolean-positive (user-reg.: true). The client filters C2 727, 729 for the Boolean functionalities results in passing through functionalities which are available 733, 735, here because the full version 711 has a capability of user-registration of true, and the functionality properties 715, 717 of the get document history 707 and get converted documents 709 functionalities require user-registration of true. The client filter C2 725 which was applied to the intersection results in a decision 731 that formats not empty are OK.

Then the server filter S1 737 performs an intersection with the C2 intersection results (which are the client/functionality formats) and the server capabilities (server formats). The resulting formats 751 are DOC and PDF.

Then, the server filters S2 753, 759, 765 perform further processing to apply server filters to each of the capabilities resulting from the intersection, to filter out/pass through formats. Each of the server filters S2 753, 759, 765 results in an indication of functionalities and their capabilities that are supported by the type of client-server-functionality combination, here, formats not empty are OK 755, and convert document functionality 757 supports DOC and PDF formats; formats 1<=2 are supported, and the get document functionality 763 is supported; and formats 2>1 are not supported 767.

It may be noted with regard to FIGS. 5A-5B, 6A-6B and 7A-7B that the following can have the same values in each example: convert document functionality 505, 603, 703, get document history functionality 507, 605, 705, get converted documents 509, 607, 707 (and their respective functionality properties 515, 517, 519, 613, 615, 617, 713, 715, 717); the demo server 513, 621, 721 and its capabilities 511, 609, 709. Also, each of the client filters C1 521, 619, 719 can be implemented the same, client filters C2 (handling intersection results) 525, 625, 725 can be implemented the same; client filters C2 (for applying a filter to a Boolean) 527, 529, 627, 629, 727, 729 can be implemented the same; server filters S1 535, 637, 737 can be implemented the same; and server filters S2 (handling intersection results) 553, 653, 753, 759, 765 can be implemented the same. Although the same overall process can be followed in the examples of FIGS. 5A, 5B, 6A, 6B, 7A and 7B to determine how to adapt the functionality to the capabilities of the client-server combination, the resulting functionality with filtered functionality properties can be different because the input capabilities are varied (in this case, the client-side capabilities are varied), and this changes the results from the filters at different stages in the process.

4. IMPLEMENTATION

A concrete example is now provided, in connection with FIG. 14 to FIG. 17. FIG. 14 (Table 1) is a table illustrating filtering rules for each property (client). FIG. 15 (Table 2) is a table illustrating filtering rules for each property (server). FIG. 16 (Table 3) is a table illustrating extracted rules for client 1, server 1. FIG. 17 (Table 4) is a table illustrating extracted rules for client 2, server 2.

In the example of Table 1 and Table 2, shown in FIG. 14 and FIG. 15 respectively, we refer to a concrete example for a functionality block: "Reports" with a specific property set and an exemplary set of client and server properties, which have an impact on the reports.

Afterwards, in Section 4.2, Extracted rules, we identify the relevant types of processing rules for the properties.

Beginning with Section, 4.3 Formal description of properties and rules, we extrapolate the teachings from the example to a general process of property evaluation.

4.1 Example

Filter Rules for Each Property (Client and Server)

As a first step, the available functionality is reduced by client properties (shown in Table 1, FIG. 14) and server properties (shown in Table 2, FIG. 15, with a result of properties which are available to the client. The "property" column of Table 1 and Table 2 defines the type of property (e.g., write allowed, model/object type restriction, perspective, can display dialogs, supported output formats, client version, response time requirements, regional settings, license, accessibilities, write allowed, can handle dialogs, supported output formats, available memory, and license. The "property value" column of Table 1 and Table 2 defines recognized values for the property type. The action column defines the "filter/adapter" handling of the property, e.g., allow, allow without restriction, filter out, user intersection, etc. The "rule" column of Table 1 and Table 2 defines how the client or server, respectively, filters C1, C2 are to handle the property, e.g., as Boolean (NEG), Boolean (POS), Intersection, AND, Value (possibly with range), and potential default rules

4.2 Extracted Rules

From Table 1 and Table 2, we can extract rules how properties are handled to filter the functionality, illustrated in Table 3 and Table 4, shown in FIG. 16 and FIG. 17. Table 3 and Table 4 define how the intersection filters and the non-intersection filters, respectively, are to filter the functionality. Table 3 defines the property type for the filter rule "INTERSECTION" is to reduce the list of types by the intersection of the properties. Table 4 defines the property type (e.g., Boolean, types, or value), the filter rule (e.g., positive, negative, negative with special default handline, empty set intersection, AND, and range of value), and the result (filter if true→false, filter if false→true, overwrite the rule with a default, filter if list is empty, all types must be provided, or accept if value-condition is true). Table 4 also includes a "description" column that explains the handling.

An example for a default handling (see * in Table 4, FIG. 17) could be the following:

Client supports no dialogs

Although the client does not provide dialog capability, it reacts somehow if a dialog should be displayed. There are two possibilities:

(A) If a dialog should be displayed, use the controls' default values and return these values as if the user simply left the dialog without any changes by clicking OK.

(B) The client knows client specific (or user AND client specific) default values for each dialog and provides these values as dialog results.

4.3 Formal Description of Properties and Rules

The properties of the client, server and functionality can be defined using the XML schema shown in FIG. 18A to FIG. 18C, expressly referred to in the claims as the "XML schema for client, server and functionality".

4.4 Formal Process of Property Evaluation ("Availability Check")

Figure 8:
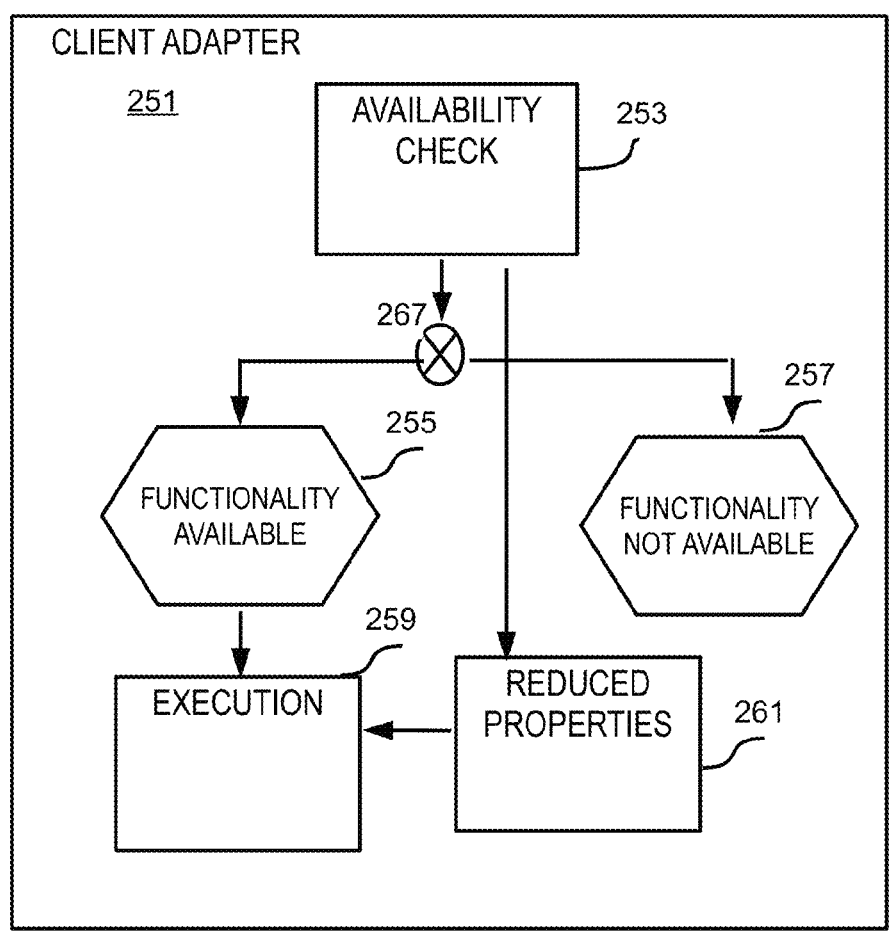
FIG. 8 is a functional flow diagram explaining a part of FIG. 2 and illustrating reduced properties as input for execution.

In the FIG. 8, which is a detail of the client adapter 251 portion of FIG. 2, there are illustrated the reduced properties 261 as an input for the execution 259 after the intersection 267 is performed to determine which functionality properties are available 255 and which are not available 257.

Figure 9:
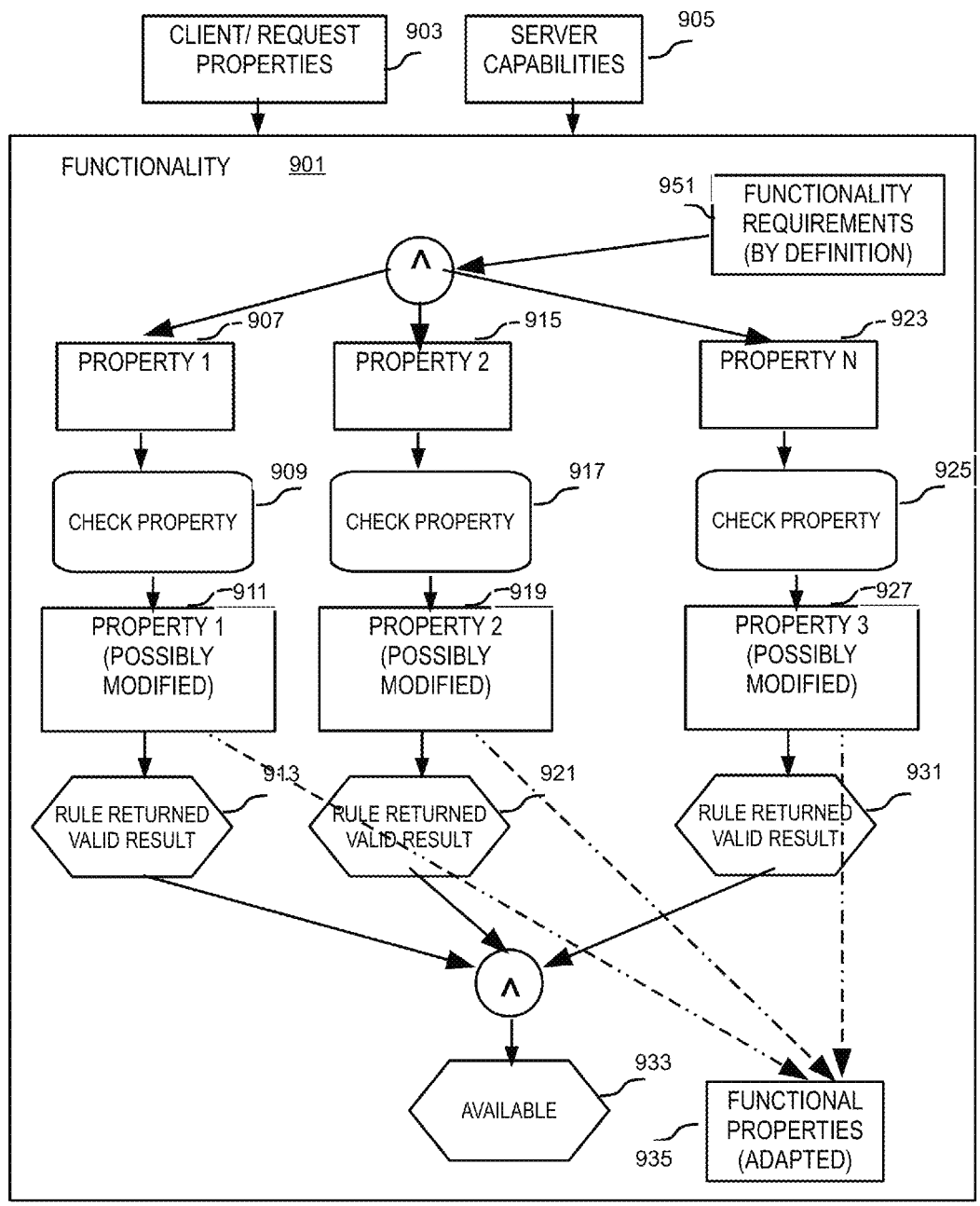
FIG. 9 is a functional flow diagram illustrating an availability check process.

FIG. 9 explains the availability check process in a detailed way. Referring now to FIG. 9, a functional flow diagram illustrating an availability check process will be discussed and described in the following sections, referring to illustrating in FIG. 10 (a functional flow diagram illustrating a check property preprocessor), FIG. 11 (a functional flow diagram illustrating an evaluation of list properties), and FIG. 12 (a functional flow diagram illustrating an evaluation of Boolean and value properties).

4.4.1 Overview

The availability check for a functionality 901, shown for example in FIG. 9, gets the client properties 903 and the server properties (capabilities) 905 as input data and uses its own reference properties 907, 915, 923 for comparison. For each of the functionality properties 907, 915, 923, the availability check 901 checks 909, 917, 925 the client or server property against the properties from the functionality requirements 951 of the functionality; each check 909, 917, 925 provides the property (possibly modified) 911, 919, 925 (which are included in an updated set of functional properties 935); and a corresponding rule is returned as a valid results 913, 921, 931.

The result is the information whether the functionality is available 993 and (if yes) the (possibly) updated property set 935 of the "instance" of the functionality.

Figure 10:
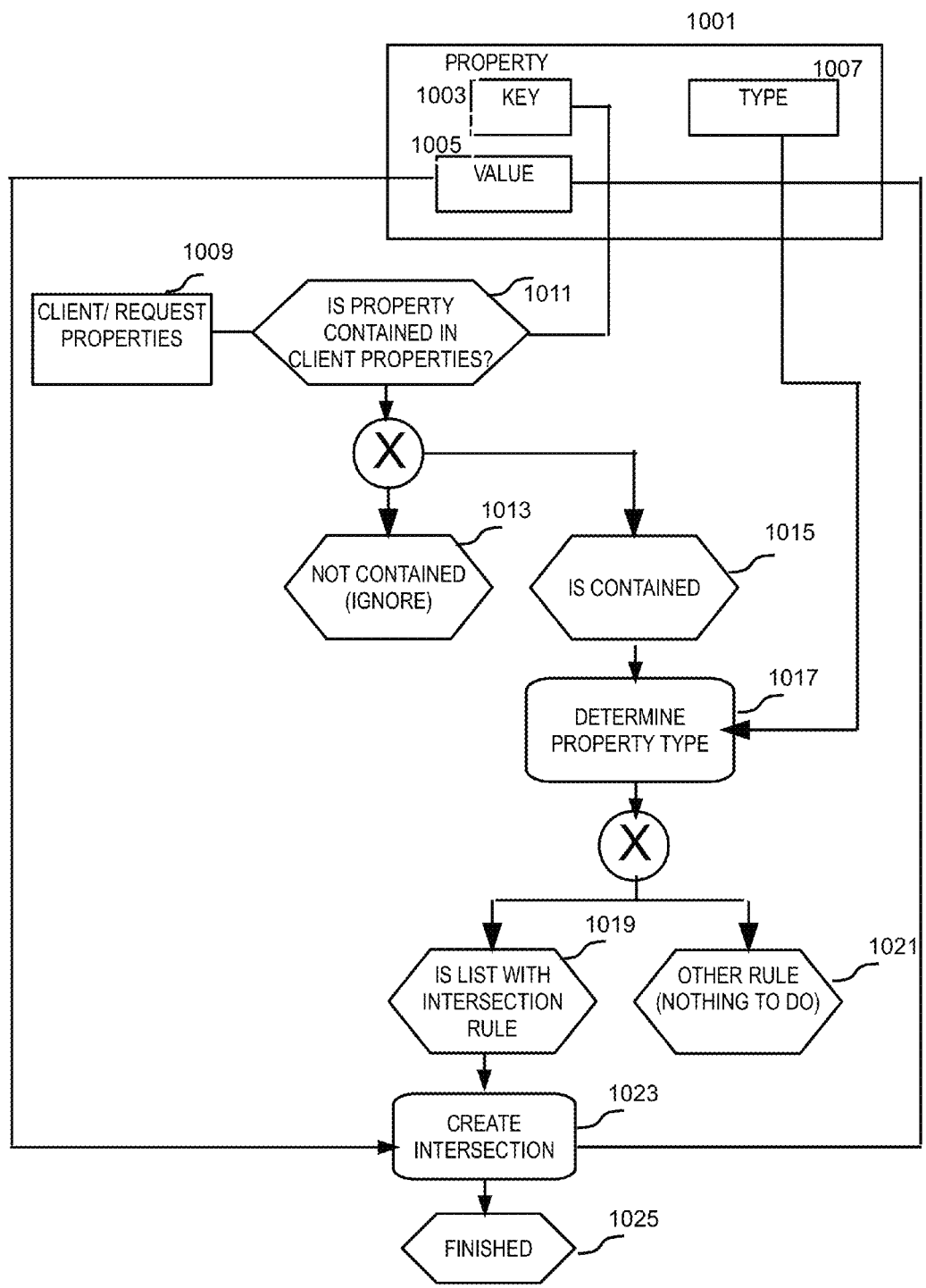
FIG. 10 is a functional flow diagram illustrating a check property preprocessor, optionally including the intersection of properties.

Reference is now made to FIG. 10, which further explains the "Check Property" 909, 915, 923 of FIG. 9, which is executed per each property of the functionality. It should be noted that similar elements appear through FIG. 10, FIG. 11 and FIG. 12, which are split up for ease of discussion.

4.4.2 Preprocessing Step (C1/S1)

As shown in FIG. 10, for "list" type properties 1001 which are associated with rule "Intersection", the intersection 1023 itself is performed as a preprocessing step before the property evaluation step is performed. The step is explained for client properties but exactly the same process is executed again for the server properties.

As illustrated, a definition of a property 1001 can include a key 1003, a value 1005, and a type 1007. Client and request properties 1009 are checked to determine 1011 whether the key 1003 of the property 1001 as defined is contained in the client and request properties 1009. If it is not contained, the property is ignored 1003. If it is contained 1015, then the type 1007 of the property 1001 and the type of the client/request properties 1009 is determined 1017. If the rule associated with the property 1001 is a not a list with an intersection rule 1021, then there is nothing to do. If the rule associated with the property 1001 is a list with an intersection rule 1019, then an intersection of the client and/or request properties together with the value 1005 from the property 1001 is created 1023; and the flow is finished 1025.

Figure 11:
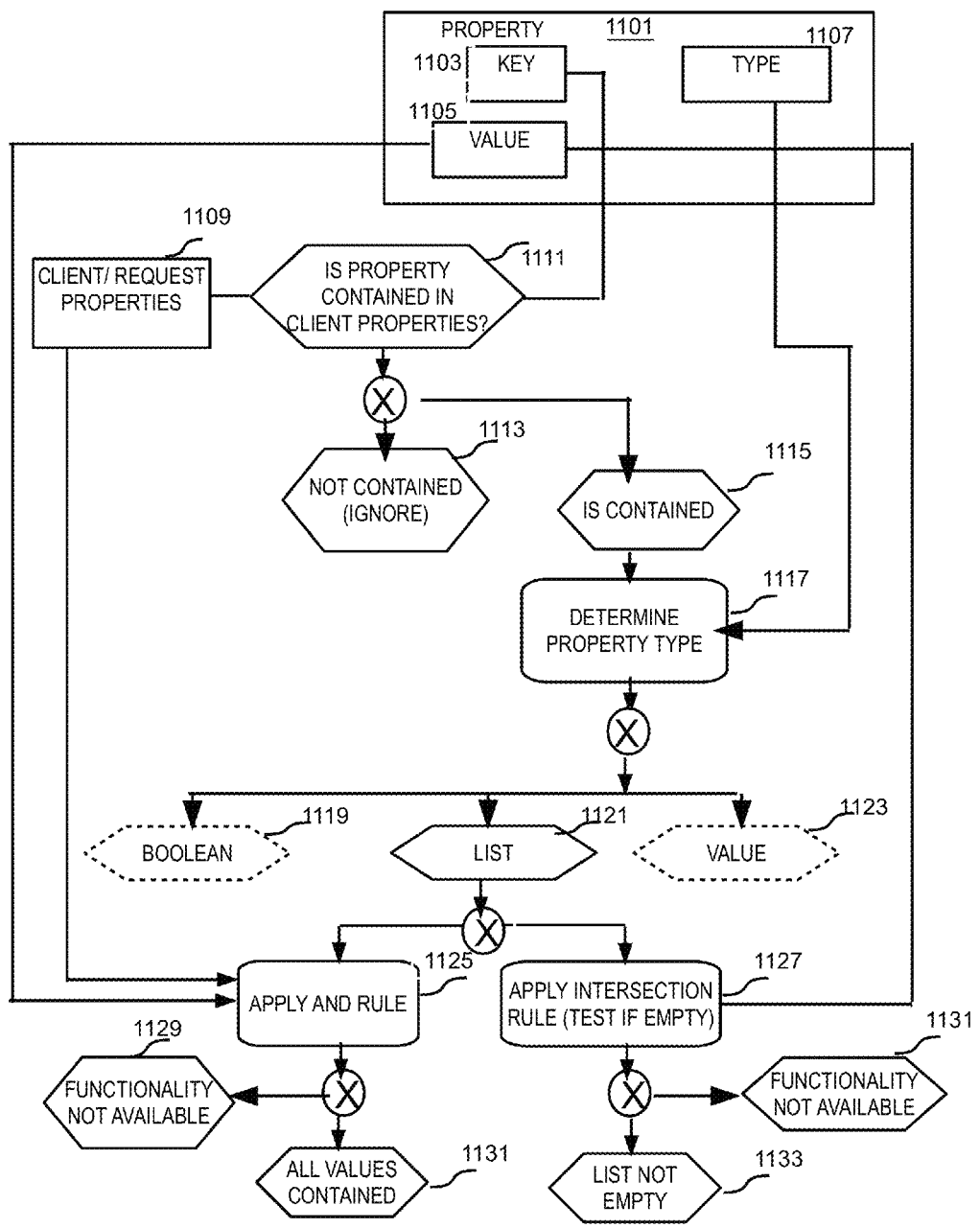
FIG. 11 is a functional flow diagram illustrating an evaluation of list properties.
Figure 12:
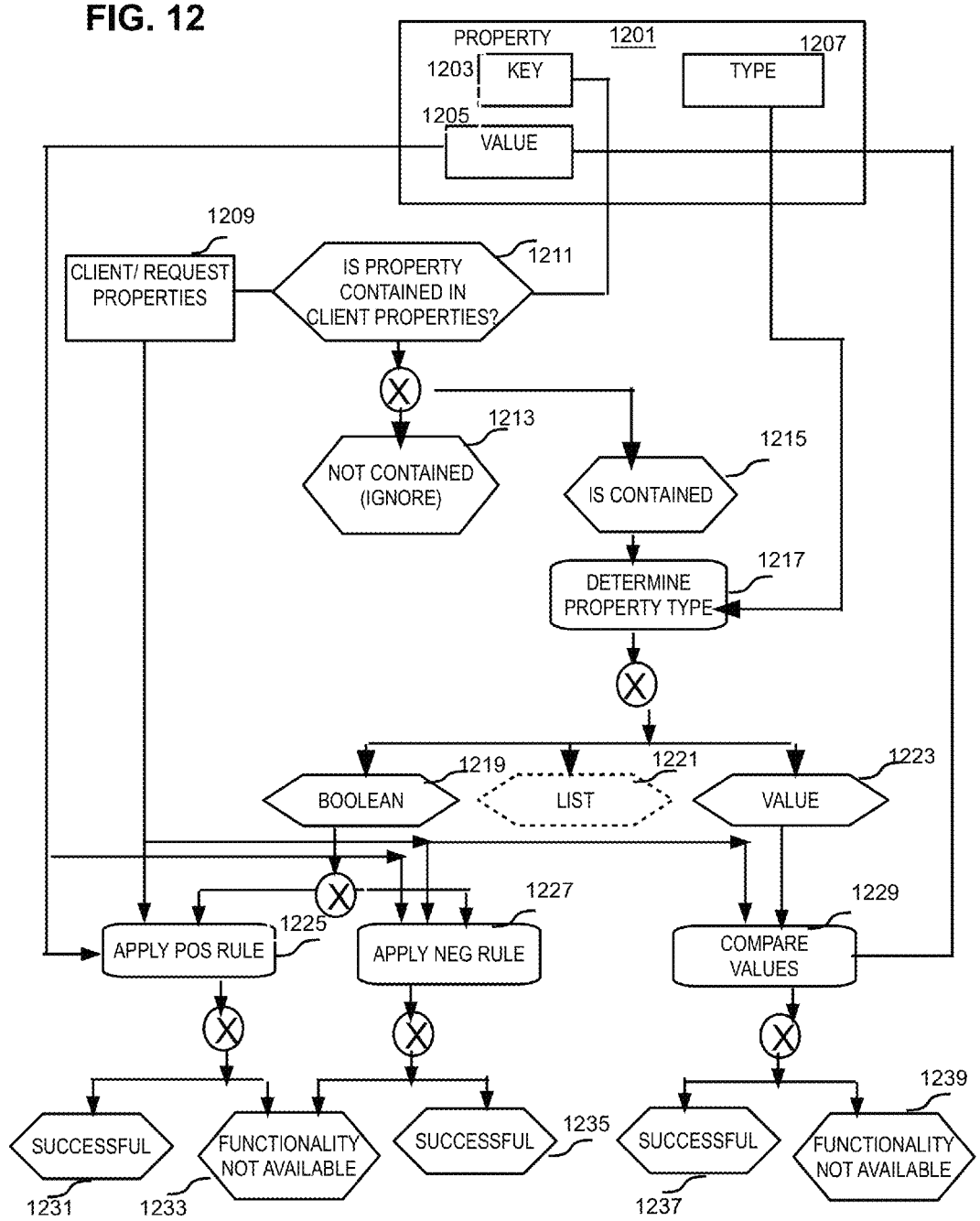
FIG. 12 is a functional flow diagram illustrating an evaluation of Boolean and value properties.

The preprocessing step of FIG. 10 is followed by the evaluation step of FIG. 11 and FIG. 12.

4.4.3 Evaluation Step (C2/S2)

For more clarity, we divided this step in two figures:

Evaluation step for list properties (FIG. 11)

Evaluation step for Boolean and value properties (FIG. 12)

Referring now to FIG. 11 and FIG. 12, a functional flow diagram illustrating an evaluation of list properties, and a functional flow diagram illustrating an evaluation of Boolean and value properties, respectively, will be discussed and described.

The step is explained for client properties but exactly the same process is executed again for the server properties.

As illustrated in FIG. 11, a definition of a property 1101 includes a key 1103, a value 1105, and a type 1107. Client and request properties 1109 are checked to determine 1111 whether the key 1103 of the property 1101 as defined is contained in the client and request properties 1109. If it is not contained, the property is ignored 1113. If it is contained 1115, then the type 1107 of the property 1101 and the type of the client/request properties 1109 is determined 1117. Illustrated herein, a type of property can be Boolean, 1119, list 1121, or a value 1123. If the property 1101 is the list 1121, then the AND rule is applied 1125 to the client or request properties 1109 together with the value 1105 of the property; and the intersection rule 1127 is applied based on the value 1105 of the property. The result of the AND rule 1125 determines whether the functionality is not available 1129, or alternatively all of the values that are contained 1131. The result of the intersection rule 1127 determines whether the functionality is not available 1131, or whether the list is not empty 1133.

As illustrated in FIG. 12, a definition of a property 1201 includes a key 1203, a value 1205, and a type 1207. Client and request properties 1209 are checked to determine 1211 whether the key 1203 of the property 1201 as defined is contained in the client and request properties 1209. If it is not contained, the property is ignored 1213. If it is contained 1215, then the type 1207 of the property 1201 and the type of the client/request properties 1209 are determined 1217. A type of property can be Boolean 1219, list 1221, or a value 1223. If the property 1201 is Boolean 1219, then the Boolean-positive rule is applied 1225 to the client or request properties 1209 together with the value 1205 of the property 1201; and the Boolean-negative rule 1227 is also applied; this determines whether the functionality is not available 1233 or whether the application of the rule is successful 1231, 1235. If the property 1201 is a value 1223, then the value 1205 of the property 1201 is compared to the corresponding value of the client or request properties 1209; this determines whether the functionality is not available 1239 or whether the comparison is successful 1237.

4.5 Adapt Behavior

The second step explains how properties may have an effect on each functionality itself. In contrast to the property filtering (4.2 Extracted rules), there is no rule set how this could be performed on an abstract level. Nevertheless, at least the same individual implementation for all scenarios, properties can be handled centrally for all "component APIs" (see FIG. 2).

The following table shows some possible examples for individual behavioral changes.

| Property | Action |
| --- | --- |
| type restrictions | Restrict evaluated types to the given type list |
| Perspective | make only those APIs available to the functionality that are allowed by the user's experience level and field of interest if server supports 'Access-levels': restrict API to given level (experience), see below. |
| Client version | Use version-specific API (if supported) e.g. @since(1.6) @until(1.5) Use version information in implementation if API semantic changed |
| Response time | User specifies runtime in terms of S, M, L, XL and server load can be optimized using this setting (100xS can run on same server, but only 2xXL) |
| Regional settings | Result depends on regional setting R to L, L to R Date/time formats Used string table/resources/images |
| Accessibility | Client specifies base font size Possibility of model graphics replaced by model/process descriptions (see ProcessLive fact sheets) |

The data access behavior can be influenced in a more generic way.

| Data access | Action | How to achieve |
| --- | --- | --- |
| Versionable | cut off versioning APIs | See 4.5.1 Access levels |
| Read-only datastorage (ex. " Publisher Server" from Error! Reference source not found. or older version context) | Do not allow any write operation | See 4.5.1 Access levels (1) |
| Limited write access | Group functions by 'access level' (annotations) | See 4.5.1 Access levels(2) |

The adaption of the behavior of an API can be implemented using a hierarchy of different "Access levels":

4.5.1 Access Levels

Figure 13:
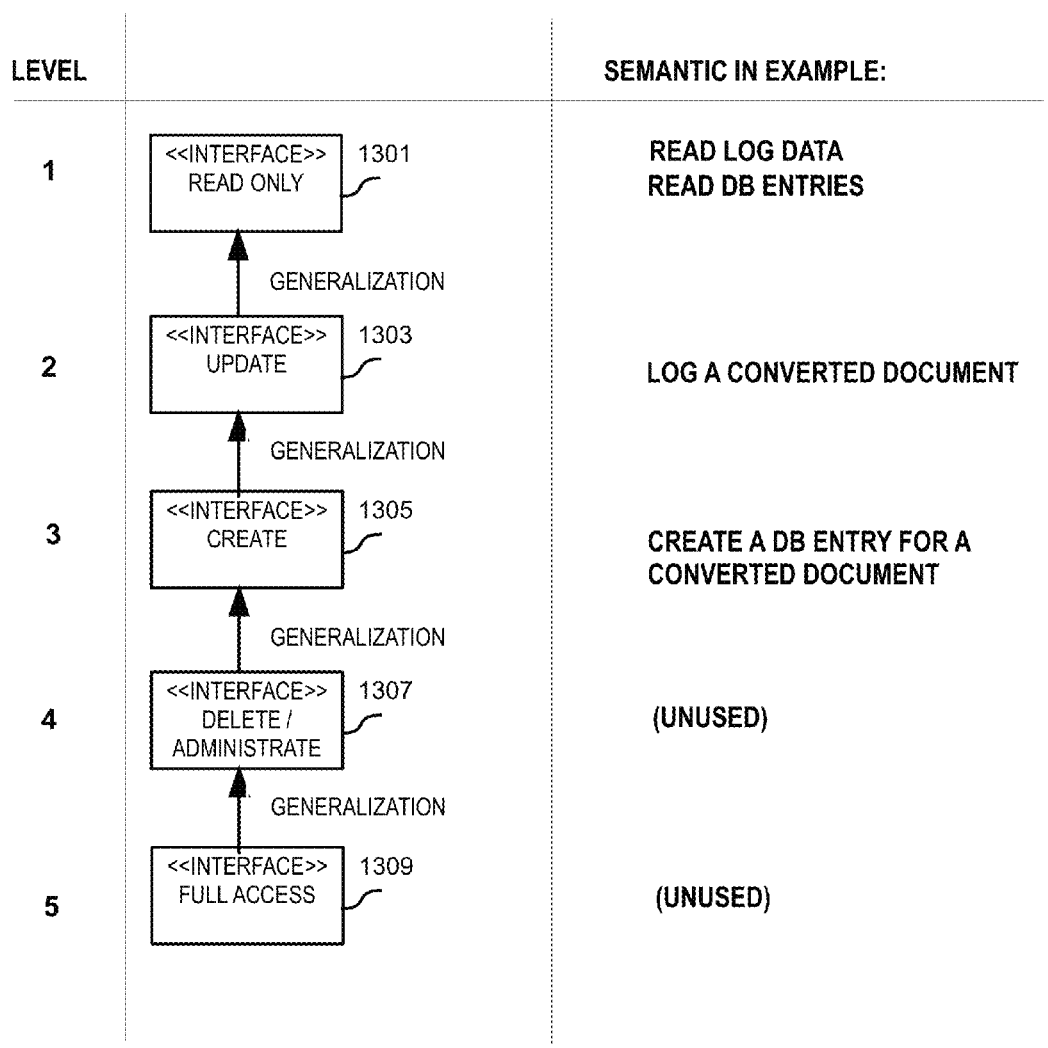
FIG. 13 is a block diagram illustrating a document converter application.

Referring now to FIG. 13, a block diagram illustrating a document converter application will be discussed and described. Here, there are access levels 1 to 5, and each access level is defined to have a corresponding interface. The interfaces provide full access 1309, delete/administrate 1307, create 1305, update 1303, and read only 1301, for access levels 5 to 1, respectively. Each access level is a generalization from the lower level. A semantic example of read only 1301 capabilities is "READ LOG DATA" or "READ DB ENTRIES". A semantic example of update 1303 capabilities is "LOG A CONVERTED DOCUMENT." A semantic example of create 1305 capabilities is "CREATE A DB ENTRY FOR A CONVERTED DOCUMENT."

The access level is an ordinal value which can be easily matched between functionality and the server capabilities:

The server exposes its internal access level "n" by a property value and the functionality defines the access level "m" which is needed by the functionality.

The adaption can be performed, for example in two ways:
n>m: The API capabilities are larger than needed: API adapts to this level by forbidding functions with a higher access level by returning a restricted API.
n<m: The API does not provide the needed functionality: functionality cannot be used (forbid functionality).

There can be an API implementation for each access level while functionalities from lower levels can be inherited.

Example for a set of API levels:
1) read only
2) update: allow modifications of existing objects (property changes)
3) create: allow creation of new objects
4) delete/administrate: allow deletion of existing objects and calling administrative operations
5) full access (everything else)

Our example (see Section 3.5 Example 2: A document converter application) may look like the example of FIG. 13. In FIG. 13, each "interface" symbolizes the API of the assigned level. An inheritance hierarchy as illustrated here is one possible implementation of access levels.

4.5.2 API Modes

The implementation of "Access levels" can be done in different ways. One must decide which behavior meets the requirements best.

Some might lead to runtime errors, some behave "quietly" correct. If a developer develops some new functionality which uses an API level, in "debug" mode one would prefer error messages (exceptions) when a functionality is determined to be not available (modes: "Strict", "Partial"); but in production environments, another behavior without runtime errors might be a better solution (mode: "Robust").

So one could choose from different kinds of API implementations:
Robust implementation of interfaces:
  API must implement all levels
  even forbidden functions succeed (but do nothing, return the negative success value)
  no "Unsupported operation" exceptions
Strict implementation of interfaces:
  API must implement all levels
  for unsupported levels: all implementations throw "Unsupported operation" exceptions
Partial implementation of interfaces:
  reduced API, unsupported levels are not implemented.
  runtime exceptions occur The API modes "Strict" and "Robust" can be realized easily by inheritance, as well as "Partial" API mode, which returns the maximum supported level if the requested level is greater than the highest supported level. The principals of these level designations can be expanded to similar level designations and/or other numbers of levels such as 3 or 5 or more.

As will be understood in the art, a computer system on which the foregoing embodiments is implemented can accommodate one or more disk drives or removable storage. Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. The processor, memory, a disk drive and/or removable storage medium are referred to as "computer-readable storage media" and provide non-transitory storage of computer programs and data.

It should be understood that the foregoing embodiments are described in connection with logical groupings of functions or resources. One or more of these logical groupings may be performed by different components from one or more embodiments. Likewise, functions may be grouped differently, combined, or augmented without departing from the scope. Similarly the present description may describe various databases or collections of data and information. One or more groupings of the data or information may be omitted, distributed, combined, or augmented, or provided locally and/or remotely without departing from the scope.

The detailed descriptions, which appear herein, may be presented in terms of program procedures executed on a computer or a network of computers. These procedural descriptions and representations herein are the means used by those skilled in the art to most effectively convey the substance of their work to others skilled in the art.

Further, an embodiment has been discussed in certain examples as if it is made available by a provider to a single customer with a single site. An embodiment may be used by numerous users, if preferred, and the users can be at one or more sites.

The system used in connection herewith may rely on the integration of various components including, as appropriate and/or if desired, hardware and software servers, applications software, database engines, server area networks, firewall and SSL security, production back-up systems, and/or applications interface software.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may sometimes contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

Terms as used herein are intended to be interpreted as understood to one of skill in the all of the arts computer client-server architecture, instead of as interpreted by a more general dictionary.

Furthermore, the networks of interest for communicating between computers onto which some embodiments may be distributed include those that transmit information in packets, for example, those known as packet switching networks that transmit data in the form of packets. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system that adapts a functionality to a client and server combination, comprising:
   a processor, the processor is configured to:
      retrieve, responsive to a request of a client for a functionality, pre-configured properties of the client, pre-configured properties of the requested functionality, and pre-configured properties of a server on which the requested functionality is run, wherein
         the functionality is offered as a functionality block by an application or service that runs on a combination of the client and the server, and the functionality block contains syntax that defines the pre-configured properties,
         the pre-configured properties in the functionality block define different property types, at least one property value of each of the different property types, at least one functionality value for each of the property values of each of the different property types, and at least one rule of each of the different property types,
         the at least one rule instructs the processor how to perform an availability check for the different property type based on the different property type, the property values of the different property type, the functionality values of the property value of the different property type, and the at least one functionality value for the different property type;
      perform the availability check, based on the retrieved pre-configured properties of the client, pre-configured properties of the server, and pre-configured properties of the requested functionality, to eliminate, from an instance of the functionality block, properties of the requested functionality which are not capable of functioning on the combination of the client and the server and to adapt, in the instance of the functionality block, behavior of the functionality to the combination of the client and the server, and
      provide the instance of the functionality block as a result from the availability check as a set of properties in which the requested functionality is adapted to be executed on the combination of the client and the server.

2. The computer system of claim 1, wherein the processor is further configured to enable execution, on the combination of the client and the server, of the requested functionality, the execution being limited to the set of properties which is the result of the availability check.

3. The computer system of claim 1, wherein the processor is further configured so that the availability check incorporates a four-pass filter.

4. The computer system of claim 1, wherein the rules include intersection rules and non-intersection rules, the intersection rules and the non-intersection rules being defined by the syntax contained in the functionality block, the availability check comprising:
   in a first client filter, perform intersection rule preprocessing to reduce the pre-configured properties in the instance of the functionality block to ore-configured properties of the client, so as to reduce a functionality set of the client to fit with required functionality as indicated in the functionality block;
   in a second client filter, performed after the first client filter, based on the non-intersection rules, remove the functionality from the instance of the functionality block when the functionality is determined to be not compatible with the pre-configured properties of the client, so as to provide functionalities not incompatible with capabilities of the client;
   in a first server filter, perform intersection rule preprocessing based on the functionality set from the first client filter and the instance of the functionality block from the second client filter to further reduce the pre-configured properties in the instance of the functionality block to pre-configured properties of the server, so as to reduce a functionality set of the server to fit with the required functionality as indicated in the functionality block; and
   in a second server filter, performed after the first client and server filters, based on the non-intersection rules, further remove the functionality from the instance of the functionality block when the functionality is determined to be not compatible with the pre-configured properties of the server, so as to provide functionalities not incompatible with capabilities of the server.

5. The computer system of claim 1, wherein the availability check is performed, based on the retrieved pre-configured properties of the client, the retrieved pre-configured properties of the server, and the retrieved pre-configured properties of the requested functionality, prior to connecting the client to the server for the requested functionality.

6. The computer system of claim 1, wherein the pre-configured properties further comprise actions that instruct the processor as to which of the pre-configured properties to allow and to filter out based on the results of application of the rules, and the processor is configured to perform the actions as part of the availability check.

7. The computer system of claim 1, wherein the processor is further configured to define the pre-configured properties of the client, the pre-configured properties of the server and the pre-configured properties of the requested functionality using an XML schema consistent with the XML schema for client, server and functionality.

8. A method that adapts a functionality to a client and server combination, comprising:

retrieving, by a processor, responsive to a request of a client for a functionality, pre-configured properties of the client, pre-configured properties of the requested functionality, and pre-configured properties of a server on which the requested functionality is run, wherein the functionality is offered as a functionality block by an application or service that runs on a combination of the client and the server, and the functionality block contains syntax that defines the pre-configured properties, the pre-configured properties in the functionality block define different property types, at least one property value of each of the different property types, at least one functionality value for each of the property values of each of the different property types, and at least one rule of each of the different property types, the at least one rule instructs the processor how to perform an availability check for the different property type based on the different property type, the property values of the different property type, the functionality values of the property value of the different property type, and the at least one functionality value for the different property type;

performing, by the processor, the availability check, based on the retrieved pre-configured properties of the client, pre-configured properties of the server, and pre-configured properties of the requested functionality, to eliminate, from an instance of the functionality block, properties of the requested functionality which are not capable of functioning on the combination of the client and the server and to adapt, in the instance of the functionality block, behavior of the functionality to the combination of the client and the server; and providing, by the processor, the instance of the functionality block as a result from the availability check as a set of properties in which the requested functionality is adapted to be executed on the combination of the client and the server.

9. The method of claim 8, further comprising enabling, by the processor, execution on the combination of the client and the server, of the requested functionality, the execution being limited to the set of properties which is the result of the availability check.

10. The method of claim 8, further comprising performing, by the processor, a four-pass filter as part of the availability check.

11. The method of claim 8, wherein the rules include intersection rules and non-intersection rules, the intersection rules and the non-intersection rules being defined by the syntax contained in the functionality block, the availability check further comprising:

in a first client filter, performing intersection rule preprocessing to reduce the pre-configured properties in the instance of the functionality block to pre-configured properties of the client, so as to reduce a functionality set of the client to fit with required functionality as indicated in the functionality block;

in a second client filter, performed after the first client filter, based on the non-intersection rules, removing the functionality from the instance of the functionality block when the functionality is determined to be not compatible with the pre-configured properties of the client, so as to provide functionalities not incompatible with capabilities of the client;

in a first server filter, performing intersection rule preprocessing based on the functionality set from the first client filter and the instance of the functionality block from the second client filter to further reduce the pre-configured properties in the instance of the functionality block to pre-configured properties of the server, so as to reduce a functionality set of the server to fit with the required functionality as indicated in the functionality block; and in a second server filter, performed after the first client and server filters, based on the non-intersection rules, further removing the functionality from the instance of the functionality block when the functionality is determined to be not compatible with the pre-configured properties of the server, so as to provide functionalities not incompatible with capabilities of the server.

12. The method of claim 8, wherein the availability check is performed, based on the retrieved pre-configured properties of the client, the retrieved pre-configured properties of the server, and the retrieved pre-configured properties of the requested functionality, prior to connecting the client to the server for the requested functionality.

13. The method of claim 8, wherein the pre-configured properties further comprise actions that instruct the processor as to which of the pre-configured properties to allow and to filter out based on the results of application of the rules, further comprising performing, by the processor, the actions as part of the availability check.

14. The method of claim 8, further comprising defining, by the processor, the pre-configured properties of the client, the pre-configured properties of the server and the pre-configured properties of the requested functionality using an XML schema consistent with the XML schema for client, server and functionality.

15. A non-transitory computer readable medium comprising executable instructions for performing a method that adapts a functionality to a client and server combination, comprising computer-executable instructions for:

retrieving, responsive to a request of a client for a functionality, pre-configured properties of the client, pre-configured properties of the requested functionality, and pre-configured properties of a server on which the requested functionality is run, wherein the functionality is offered as a functionality block by an application or service that runs on a combination of the client and the server, and the functionality block contains syntax that defines the pre-configured properties, the pre-configured properties in the functionality block define different property types, at least one property value of each of the different property types, at least one functionality value for each of the property values of each of the different property types, and at least one rule of each of the different property types, the at least one rule instructs the processor how to perform an availability check for the different property type based on the different property type, the property values of the different property type, the functionality values of the property value of the different property type, and the at least one functionality value for the different property type;

performing the availability check, based on the retrieved pre-configured properties of the client, pre-configured properties of the server, and pre-configured properties of the requested functionality, to eliminate, from an instance of the functionality block, properties of the requested functionality which are not capable of functioning on the combination of the client and the server and to adapt, in the stance of the functionality block, behavior of the functionality to the combination of the client and the server; and providing the instance of the functionality block as a result from the availability check as a set of properties in which the requested functionality is adapted to be executed on the combination of the client and the server.

16. The non-transitory computer readable medium of claim 15, further comprising enabling execution on the combination of the client and the server, of the requested functionality, the execution being limited to the set of properties which is the result of the availability check.

17. The non-transitory computer readable medium of claim 15, further comprising performing a four-pass filter as part of the availability check.

18. The non-transitory computer readable medium of claim 15, wherein the rules include intersection rules and non-intersection rules, the intersection rules and the non-intersection rules being defined by the syntax contained in the functionality block, the availability check comprising:

in a first client filter, performing intersection rule preprocessing to reduce the pre-configured properties in the instance of the functionality block to pre-configured properties of the client, so as to reduce a functionality set of the client to fit with required functionality as indicated in the functionality block;

in a second client filter, performed after the first client filter, based on the non-intersection rules, removing the functionality from the instance of the functionality block when the functionality is determined to be not compatible with the pre-configured properties of the client, so as to provide functionalities not incompatible with capabilities of the client;

in a first server filter, performing intersection rule preprocessing based on the functionality set from the first client filter and the instance of the functionality block from the second client filter to further reduce the pre-configured properties in the instance of the functionality block to pre-configured properties of the server, so as to reduce a functionality set of the server to fit with the required functionality as indicated in the functionality block; and in a second server filter, performed after the first client and server filters, based on the non-intersection rules, further removing the functionality from the instance of the functionality block when the functionality is determined to be not compatible with the pre-configured properties of the server, so as to provide functionalities not incompatible with capabilities of the server.

19. The non-transitory computer readable medium of claim 15, wherein the pre-configured properties further comprise actions that instruct a processor as to which of the pre-configured properties to allow and to filter out based on the results of application of the rules, further comprising performing the actions as part of the availability check.

20. The non-transitory computer readable medium of claim 15, further comprising defining the pre-configured properties of the client, the pre-configured properties of the server and the pre-configured properties of the requested functionality using an XML schema consistent with the XML schema for client, server and functionality.

* * * * *